(12) United States Patent
Shimizu et al.

(10) Patent No.: US 8,330,629 B2
(45) Date of Patent: Dec. 11, 2012

(54) ROTARY INPUT DEVICE AND REVOLUTION SENSOR USING THE SAME

(75) Inventors: Masato Shimizu, Osaka (JP); Naoki Toyota, Osaka (JP); Shiro Tsuduki, Osaka (JP)

(73) Assignee: Hosiden Corporation, Osaka (JP)

( * ) Notice: Subject to any disclaimer, the term of this patent is extended or adjusted under 35 U.S.C. 154(b) by 842 days.

(21) Appl. No.: 12/520,780

(22) PCT Filed: Mar. 31, 2008

(86) PCT No.: PCT/JP2008/056320
§ 371 (c)(1),
(2), (4) Date: Jun. 22, 2009

(87) PCT Pub. No.: WO2008/132930
PCT Pub. Date: Nov. 6, 2008

(65) Prior Publication Data
US 2010/0026532 A1 Feb. 4, 2010

(30) Foreign Application Priority Data
Apr. 19, 2007 (JP) .................................. 2007-110410

(51) Int. Cl.
H03M 11/00 (2006.01)
(52) U.S. Cl. .............................. 341/35; 341/20; 345/156
(58) Field of Classification Search .................... 341/20, 341/35; 345/156
See application file for complete search history.

(56) References Cited

U.S. PATENT DOCUMENTS 6,586,884 B2 * 7/2003 Leleve ............................. 315/82
7,175,618 B2 * 2/2007 Dabney et al. ................... 606/34
7,459,830 B2 * 12/2008 Hashimoto .............. 310/316.01

(Continued)

FOREIGN PATENT DOCUMENTS
JP 53-091629 11/1978
(Continued)

OTHER PUBLICATIONS

Office action issued by the Japanese Patent Office on Jun. 14, 2011 for corresponding JP patent application No. 2009-511724.

(Continued)

Primary Examiner — Brian Zimmerman
Assistant Examiner — Amine Benlagsir
(74) Attorney, Agent, or Firm — David N. Lathrop

(57) ABSTRACT

Disclosed is a device for accurately detecting the direction and angle of rotation independently of ambient environments. The device is provided with an equally-spaced electrode holding plate 52 having equally-spaced electrodes 56 arranged along the circumference of a first circle, and a fixed phase electrode holding plate having α a-phase electrodes and β b-phase electrodes both arranged along the circumference of a second circle opposite the first circle, wherein when α is equal to or greater than 2, two arbitrary ones of the a-phase electrodes are at positions displaced an angle of an integral multiple of $2\pi/N$ apart on the circumference of the second circle in the rotation direction. When β is equal to or greater than 2, two arbitrary ones of the b-phase electrodes are at positions displaced an angle of an integral multiple of $2\pi/N$ apart on the circumference of the second circle in the rotation direction. The phase electrodes are arranged so that the a-phase electrodes and the b-phase electrodes are not displaced an angle of an integral multiple of $\pi/N$ on the circumference of the second circle in the rotation direction.

13 Claims, 26 Drawing Sheets

U.S. PATENT DOCUMENTS

| | | | |
|---|---|---|---|
| 7,643,131 B2 * | 1/2010 | Tsunesada et al. | 356/4.07 |
| 8,060,195 B2 * | 11/2011 | Gurewitsch et al. | 600/547 |
| 2002/0050719 A1 * | 5/2002 | Caddell et al. | 290/54 |
| 2003/0001508 A1 * | 1/2003 | Leleve | 315/77 |
| 2004/0138653 A1 * | 7/2004 | Dabney et al. | 606/34 |
| 2004/0196257 A1 * | 10/2004 | Sato et al. | 345/156 |
| 2007/0194660 A1 * | 8/2007 | Hashimoto | 310/316.01 |
| 2007/0255271 A1 * | 11/2007 | Dabney et al. | 606/39 |
| 2009/0079955 A1 * | 3/2009 | Tsunesada et al. | 356/4.01 |
| 2009/0171234 A1 * | 7/2009 | Gurewitsch et al. | 600/547 |

FOREIGN PATENT DOCUMENTS

| | | |
|---|---|---|
| JP | 59-23218 | 2/1984 |
| JP | 59-95279 | 6/1984 |
| JP | 64-029772 | 1/1989 |
| JP | 08-122362 | 5/1996 |
| JP | 10-326143 | 12/1998 |
| JP | 2000-111360 | 4/2000 |
| JP | 2001-099684 | 4/2001 |
| JP | 2001-324397 | 11/2001 |
| JP | 2004-303684 | 10/2004 |
| JP | 2004-311196 | 11/2004 |
| JP | 2005-149856 | 6/2005 |
| JP | 2007-078249 | 3/2007 |

OTHER PUBLICATIONS

Extended European Search Report issued Oct. 27, 2011 for corresponding European patent application No. 08 739 434.2.

Decision of Rejection issued on Aug. 23, 2011 by the Japanese Patent Office for counterpart foreign patent application JP 2009-511724.

Office action issued by the Korean Patent Office on Jun. 29, 2011 for corresponding KR patent application No. 10-2009-7012546.

* cited by examiner

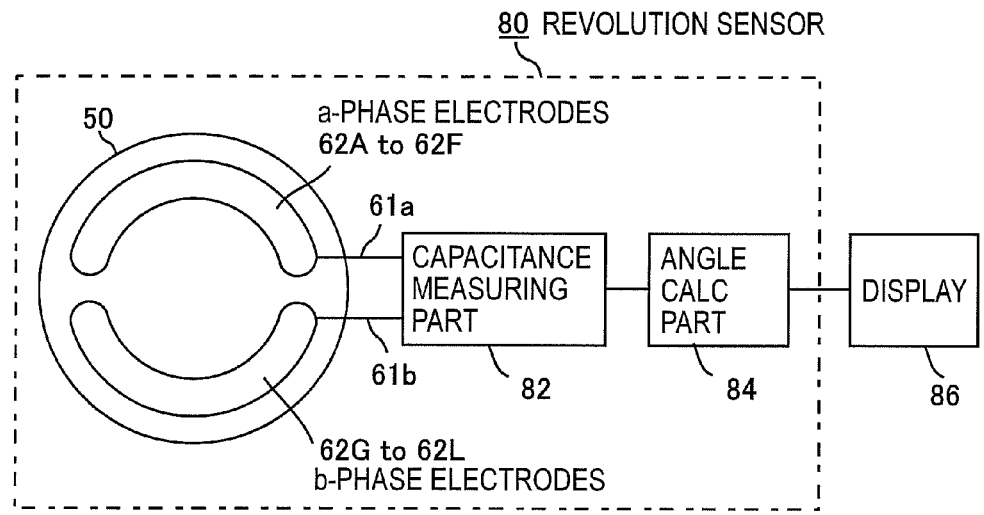
FIG. 6
FIG. 7A
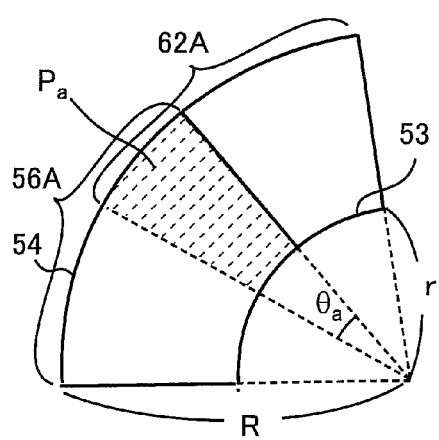
FIG. 7B
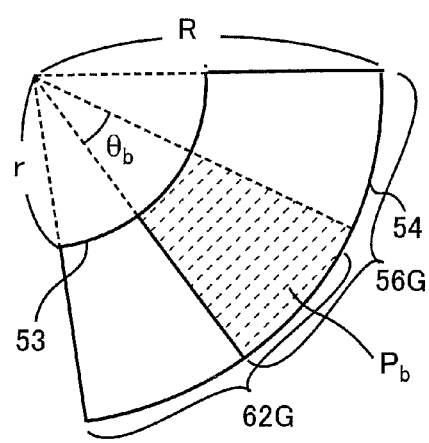

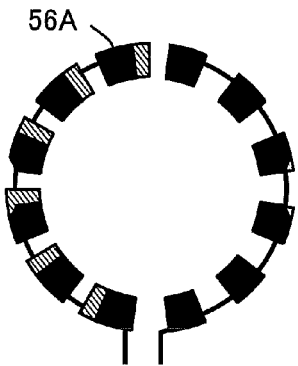
FIG. 8A
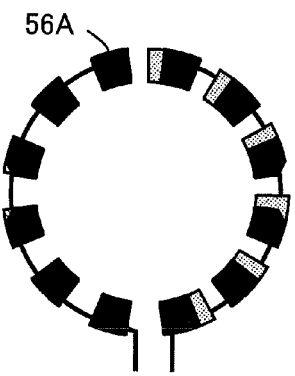
FIG. 8B
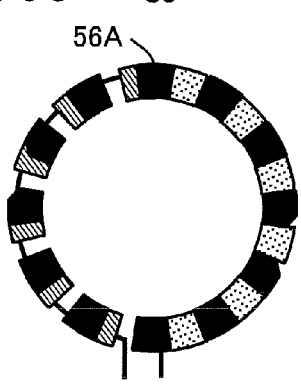
FIG. 8C
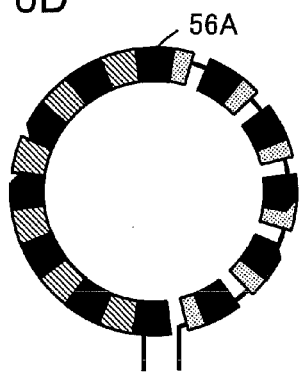
FIG. 8D
FIG. 8E
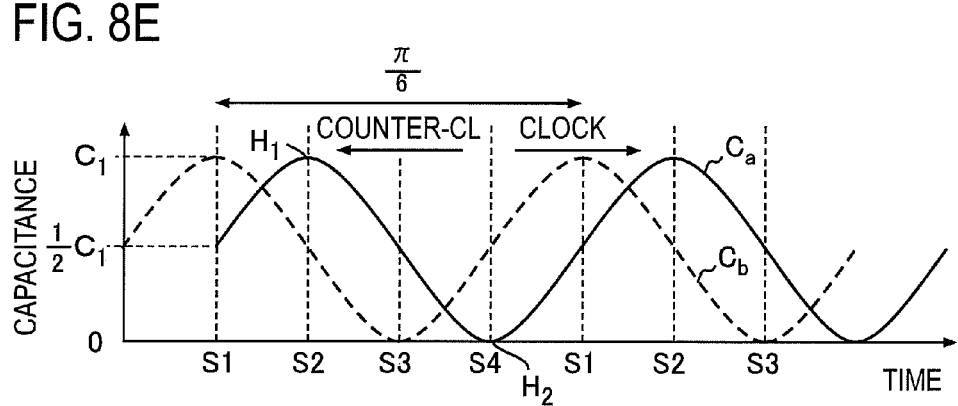

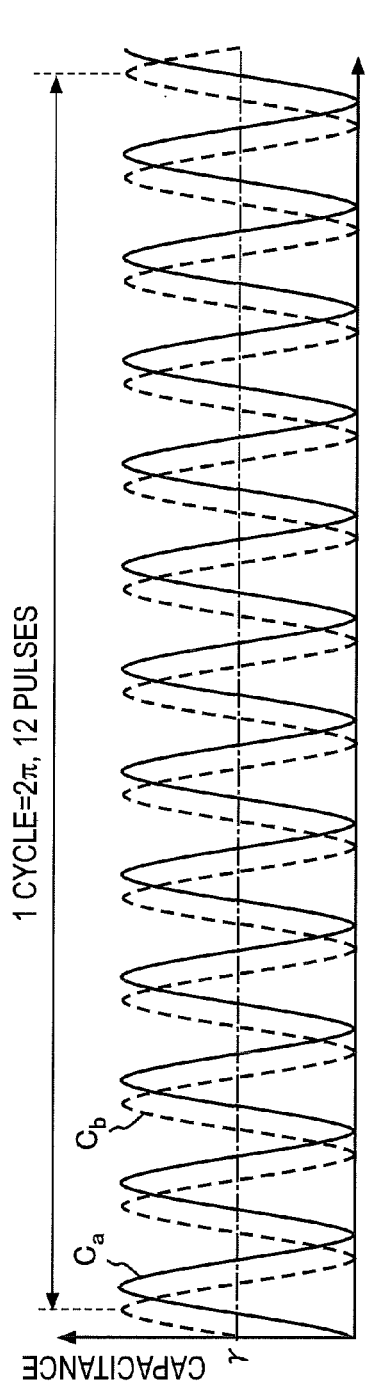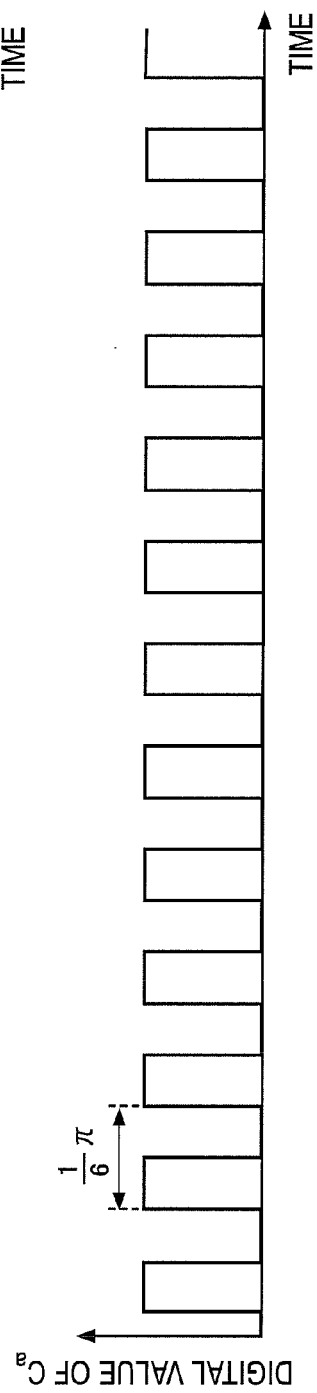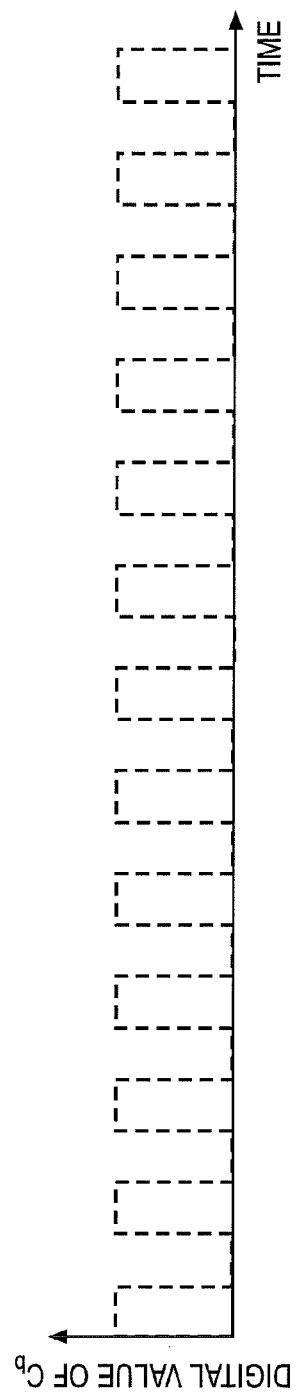

a-PHASE ELECTRODE 62F  62G
b-PHASE ELECTRODE

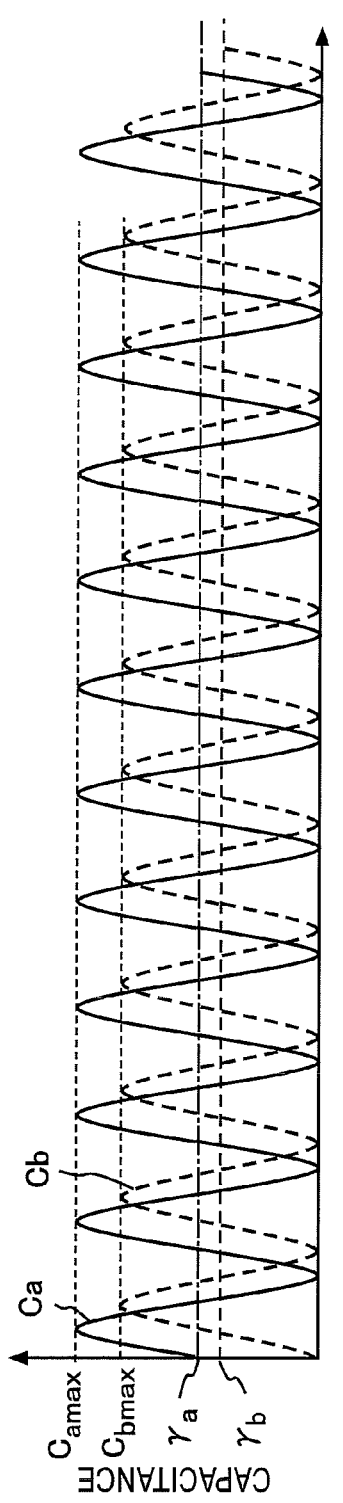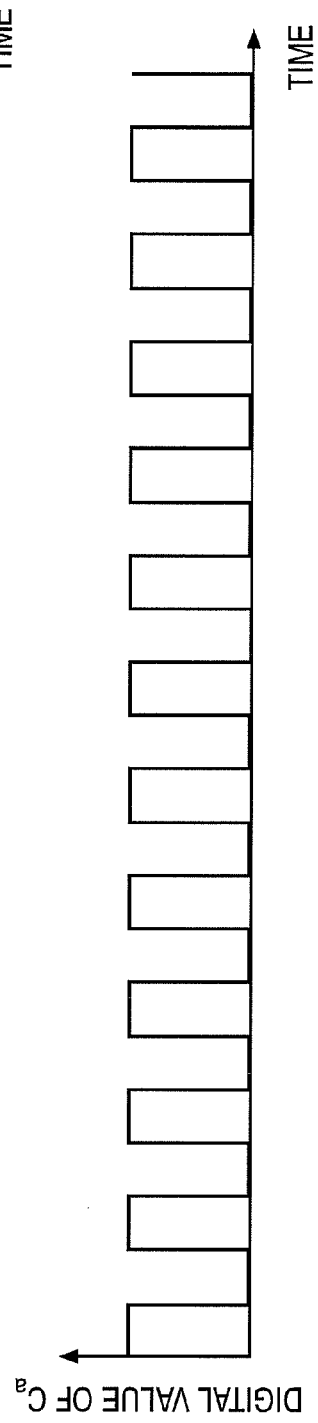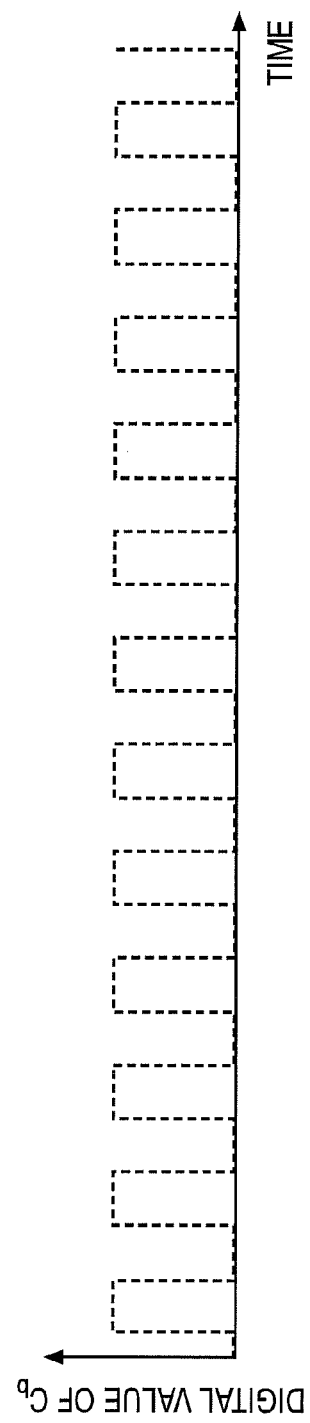

ROTARY INPUT DEVICE AND REVOLUTION SENSOR USING THE SAME

TECHNICAL FIELD

The present invention relates to a rotary-type input device and, more particularly, to a rotary input device capable of inputting therethrough rotation information and a revolution sensor using the same.

BACKGROUND ART

FIG. 1A is an exploded perspective view of a conventional rotary input device 2, and FIG. 1B is a sectional view taken along the line B-B in FIG. 1A. A disc-like rotary member 7 is formed of an insulator, and a user can turn smoothly the rotary member 7 with his finger 3 lightly held on the top of the disc-like rotary member 7. The conventional rotary input device 2 is capable of sensing the angle of rotation of the rotary member 7 caused by the finger 3.

In one part of a casing 4 shown in FIG. 1B, there is formed an operation region 2A sinking in a direction perpendicular to the rotary member 7 and (which direction will hereinafter be referred to as z-direction). In the operation region 2A there are formed recesses 8, for example, at eight circumferential positions, respectively. In these recesses 8 there are disposed eight electrodes 6a, 6b, 6c, ..., 6h, respectively. On the surfaces of the electrodes 6a to 6h in the recesses 8 there is laminated an insulating sheet 5 such that the operation region 2A is covered over the entire area thereof with the insulating sheet 5.

A rotary shaft 16 is fixed to a bearing 14 formed at the center of the operation region 2A, with the rotary member 7 rotatably mounted on the rotary shaft 16. The rotary member 7 is as thin as 1 mm or less, and is formed from a relatively hard sheet of resin such, for example, as PET (polyethylene terephthalate).

The diameter of the rotary member 7 is smaller than the operation region 2A, and the rotary member 7 is adapted to be capable of turning in the operation region 2A while sliding on the surface of the insulating sheet 5. Incidentally, the frictional resistance between the insulating sheet 5 and the rotary member 7 is small, permitting the rotary member 7 to turn smoothly.

In the conventional rotary input device 2, turning the finger 3 while lightly pressing the finger 3 against the surface of the rotary member 7 as shown in FIG. 1, the rotary member 7 may be turned together with the finger 3. This enables the user to prevent the finger 3 from straying widely from the operation region 2A while turning the rotary member 7. Further, since the user can manipulate a mechanically rotatable member, he can get a feeling of actually manipulating the rotary input device 2 (a feeling of manipulation or confidence inspired by the manipulation).

Next, a description will be given of a method of detecting the angle of rotation caused by the finger 3. Bringing the finger 3 close to or into contact with the surface of the rotary member 7, the human body serves as a grounding member producing an electrostatic capacitance C between the finger 3 and any one or adjacent ones of the electrodes 6a to 6h. The capacitance C of a parallel-plate capacitor can be expressed by the equation given below.

$$C = \in \cdot S/d \quad (1)$$

where $\in$ is the dielectric constant between the electrode 6 and the finger 3, S is the area over which the electrode 6 and the finger 3 face each other, and d is the distance between the electrode 6 and the finger 3 facing each other.

Turning the finger 3 along with the rotary member 7 toward the electrode 6a, for instance, the distance d between the finger 3 and the electrode 6a decreases and the area S increases. As a result, the value of the capacitance C increases as seen from Eq. (1). On the contrary, as the finger 3 moves away from the electrode 6a while turning the rotary member, the distance d increases with a corresponding decrease in the area S. Consequently, the value of the capacitance C decreases accordingly.

Through utilization of such variations in the value of the capacitance C, the rotary input device 2 is capable of detecting the rotation angle of the rotary member. The details of the rotary input device 2 are given in Patent literature 1. The art similar to the rotary input device 2 is also described in Patent literature 2.

Patent literature 1: Japanese Patent Application Laid Open No. 2004-311196

Patent literature 2: Japanese Patent Application Laid Open No. 2005-149856

SUMMARY OF THE INVENTION

Two problems will be described below.

The conventional rotary input device 2 is one that detects the angle of rotation by detecting a change in the capacitance between a body portion of the user, for example, the finger 3 of the user and the electrode 6, as described above. Depending on the strength or angle of the force applied to the rotary member 7 for pressing thereto the finger 3 of the user, however, the area S greatly changes, resulting in a failure to measure the capacitance C with accuracy. Another problem is the possibility that the dielectric constant will also vary with temperature changes in the finger 3 of the user. Still another problem is incapability of detecting the rotation direction of the rotary member.

Means to Solve the Problems

An object of the present invention is to provide a capacitance type rotary input device in which the capacitance being detected is less susceptible to the influence of ambient environments, and a revolution sensor using the input device.

A rotary input device according to a first aspect of the present invention comprises:

a casing;

a disc-shaped rotary member rotatably supported to said casing;

an equally-spaced electrode holding plate having N first equally-spaced electrodes spaced equidistantly along a first circle and N second equally-spaced electrodes spaced equidistantly along a second circle parallel to said first circle, said equally-spaced electrode holding plate being attached to said rotary member, said N being an integer equal to or greater than 1, and said first and second equally-spaced electrodes being electrically interconnected; and a phase electrode holding plate having α a-phase electrodes disposed along a third circle opposite said first circle in parallel relation thereto and electrically interconnected, β b-phase disposed along a fourth circle opposite said second circle in parallel relation thereto and electrically interconnected, and first and second lead wires electrically connected to said a-phase electrodes and said b-phase electrodes, respectively, said phase electrode holding plate being fixed to said casing, said a being an integer equal to or greater than 1 and said p being an integer equal to or greater than 1;

wherein said equally-spaced electrode holding plate and said phase electrode holding plate are disposed so that the centers of said first through fourth circles all lie on the line of the center of rotation of said rotary member and that said line of the center of rotation crosses at right angles all planes defined by said first through fourth circles, respectively;

wherein when said α is equal to or greater than 2, two arbitrary ones of said a-phase electrodes lie on the circumference of said second circle at positions displaced an angle of an integral multiple of $2\pi/N$ apart;

wherein when said β is equal to or greater than 2, two arbitrary ones of said b-phase electrodes lie on the circumference of said second circle at positions displaced an angle of an integral multiple of $2\pi/N$ apart; and wherein said a-phase electrodes and said b-phase electrodes are arranged with respect to the arrangement of said equally-spaced electrodes so that the angle from the rotational angular position of said equally-spaced electrode holding plate where said first equally-spaced electrodes and said a-phase electrodes overlap most with each other to the rotational angular position of said equally-spaced electrode holding plate where said second equally-spaced electrodes and said b-phase electrodes overlap most with each other may be an angle that is displaced from an integral multiple of $\pi/N$ by a predetermined angle ω which is greater than 0 but smaller than $\pi/N$.

A rotary input device according to a second aspect of the present invention comprises:

a casing;

a disc-shaped rotary member rotatably supported to said casing;

an equally-spaced electrode holding plate having N equally-spaced electrodes spaced equidistantly along a first circle, said equally-spaced electrode holding plate being attached to said rotary member, said N being an integer equal to or greater than 1 and said equally-spaced electrodes being electrically interconnected; and a phase electrode holding plate having α a-phase electrodes disposed along a second circle opposite said first circle in parallel relation thereto and electrically interconnected, β b-phase electrodes disposed along a third circle opposite said first circle in parallel relation thereto and electrically interconnected, and first and second lead wires electrically connected to said a-phase electrodes and said b-phase electrodes, respectively, said phase electrode holding plate being fixed to said casing, said a being an integer equal to or greater than 1 and said β being an integer equal to or greater than 1;

wherein said equally-spaced electrode holding plate and said phase electrode holding plate are disposed so that the centers of said first through third circles all lie on the line of the center of rotation of said rotary member and that said line of the center of rotation crosses at right angles all planes defined by said first through third circles, respectively;

wherein when said α is equal to or greater than 2, two arbitrary ones of said a-phase electrodes lie on the circumference of said second circle at positions displaced an angle of an integral multiple of $2\pi/N$ apart;

wherein when said β is equal to or greater than 2, two arbitrary ones of said b-phase electrodes lie on the circumference of said second circle at positions displaced an angle of an integral multiple of $2\%/N$ apart; and wherein said a-phase electrodes and said b-phase electrodes are arranged with respect to the arrangement of said equally-spaced electrodes so that the angle from the rotational angular position of said equally-spaced electrode holding plate where said equally-spaced electrodes and said a-phase electrodes overlap most with each other to the rotational angular position of said equally-spaced electrode holding plate where said equally-spaced electrodes and said b-phase electrodes overlap most with each other may be an angle that is displaced from an integral multiple of $\pi/N$ by a predetermined angle ω which is greater than 0 but smaller than $\pi/N$.

A rotary input device according to a third aspect of the present invention comprises:

a casing;

a disc-shaped rotary member rotatably supported to said casing;

an equally-spaced electrode holding plate having N equally-spaced electrodes spaced equidistantly along a first circle, said equally-spaced electrode holding plate being attached to said rotary member, said N being an integer equal to or greater than 1 and said equally-spaced electrodes being electrically interconnected; and a phase electrode holding plate having α a-phase electrodes disposed along a second circle opposite said first circle in parallel relation thereto and electrically interconnected, β b-phase electrodes disposed along said second circle and electrically interconnected and first and second lead wires electrically connected to said a-phase electrodes and said b-phase electrodes, respectively, said phase electrode holding plate being fixed to said casing, said a being an integer equal to or greater than 1 and said β being an integer equal to or greater than 1;

wherein said equally-spaced electrode holding plate and said phase electrode holding plate are disposed so that the centers of said first and second circles lie on the line of the center of rotation of said rotary member and that said line of the center of rotation crosses at right angles planes defined by said first and third circles, respectively;

wherein when said α is equal to or greater than 2, two arbitrary ones of said a-phase electrodes lie on the circumference of said second circle at positions displaced an angle of an integral multiple of $2\pi/N$ apart;

wherein when said β is equal to or greater than 2, two arbitrary ones of said b-phase electrodes lie on the circumference of said second circle at positions displaced an angle of an integral multiple of $27/N$ apart; and wherein said a-phase electrodes and said b-phase electrodes are arranged with respect to the arrangement of said equally-spaced electrodes so that the angle from the rotational angular position of said equally-spaced electrode holding plate where said equally-spaced electrodes and said a-phase electrodes overlap most with each other to the rotational angular position of said equally-spaced electrode holding plate where said equally-spaced electrodes and said b-phase electrodes overlap most with each other may be an angle that is displaced apart from an integral multiple of $\pi/N$ by a predetermined angle ω which is greater than 0 but smaller than $\pi/N$.

A revolution sensor according to a fourth aspect of the present invention comprises:

said rotary input device claimed in any one of the preceding claims;

a capacitance measuring part for measuring a-phase capacitances formed by said equally-spaced electrodes and said a-phase electrodes and b-phase capacitances formed by said equally-spaced electrodes and said b-phase electrodes, through said first and second lead wires; and an angle calculating part for calculating at least one of the direction and angle of rotation of said rotary member from the results of measurement of said a-phase capacitances and the results of measurement of said b-phase capacitances.

Effects of the Invention

The rotary input devices according to the present invention measure the capacitance between opposed electrodes, and hence permit extreme reduction of capacitance changes caused by the strength or angle of the force that is applied by a finger of a user to the rotary member, or a temperature change of the user's finger. Accordingly, the angle of rotation of the rotary member can be measured with accuracy.

Further, according to the revolution sensor using the rotary input device of the present invention, since a phase difference arises between a change in the capacitance between the equally-spaced electrodes and the a-phase electrodes and a change in the capacitance between the equally-spaced electrodes and the b-phase electrodes, the direction of rotation of the rotary member can be detected.

BRIEF DESCRIPTION OF THE DRAWINGS

FIG. 6 is a block diagram showing the configuration of a revolution sensor 80;
FIG. 7A is a diagram showing an overlapping area $P_a$ between an equally-spaced electrode and an a-phase electrode;
FIG. 7B is a diagram showing an overlapping area Pb between the equally-spaced electrode and a b-phase electrode;
FIG. 8A is a diagram showing a first state S1 of the relationship of angular position between the equally-spaced electrodes and the phase electrodes;
FIG. 8B is a diagram showing a second state S2;
FIG. 8C is a diagram showing a third state S3;
FIG. 8D is a diagram showing a fourth state S4;
and
FIG. 8E is a diagram showing capacitance variations;
FIG. 11A is a diagram showing capacitance variations;
FIG. 11B is a diagram showing a pulse waveform obtained by shaping a capacitance $C_a$;
FIG. 11C is a diagram showing a pulse waveform by shaping a capacitance $C_b$;
FIG. 13A is a diagram showing capacitance variations in the case where the a-phase electrodes and the b-phase electrodes of different numbers are arranged;
FIG. 13B is a diagram showing a pulse waveform obtained by shaping the capacitance $C_a$ in this case;
FIG. 13C is a diagram showing a pulse waveform by shaping the capacitance $C_b$ in this case;
FIG. 23A is a graph showing changes of an inter-electrode capacitance and the like.

BEST MODE FOR CARRYING OUT THE INVENTION

A description will be given below of the best mode for carrying out the invention.

First Embodiment

Figure 1A:
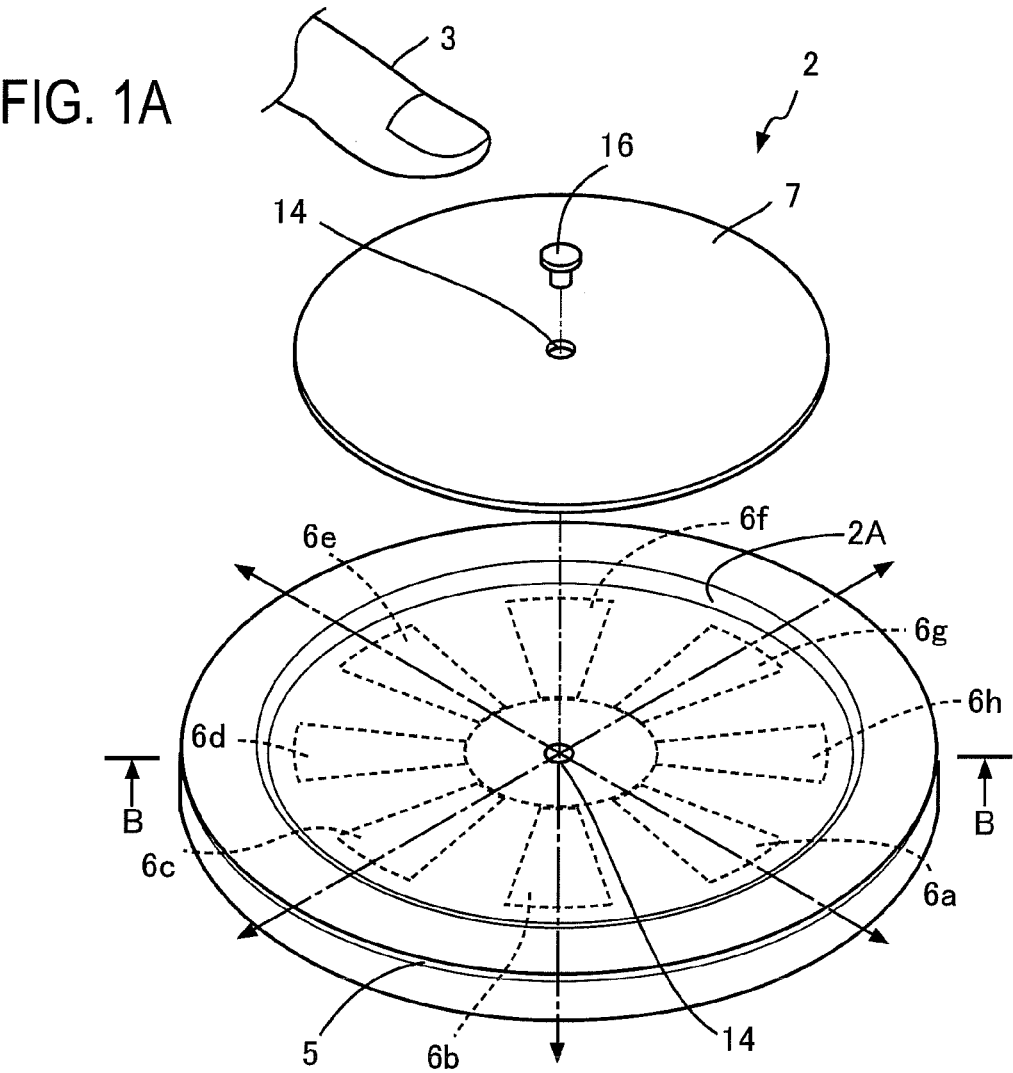
FIG. 1A is a perspective view of a conventional rotary input device 2.
Figure 1B:
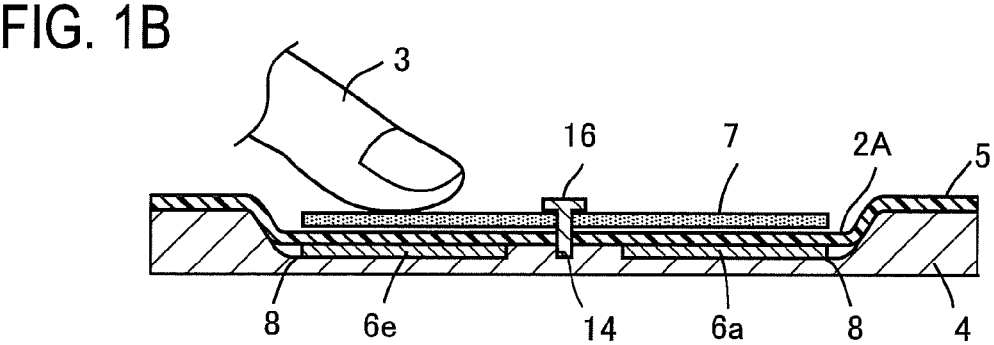
FIG. 1B is its sectional view.
Figure 2A:
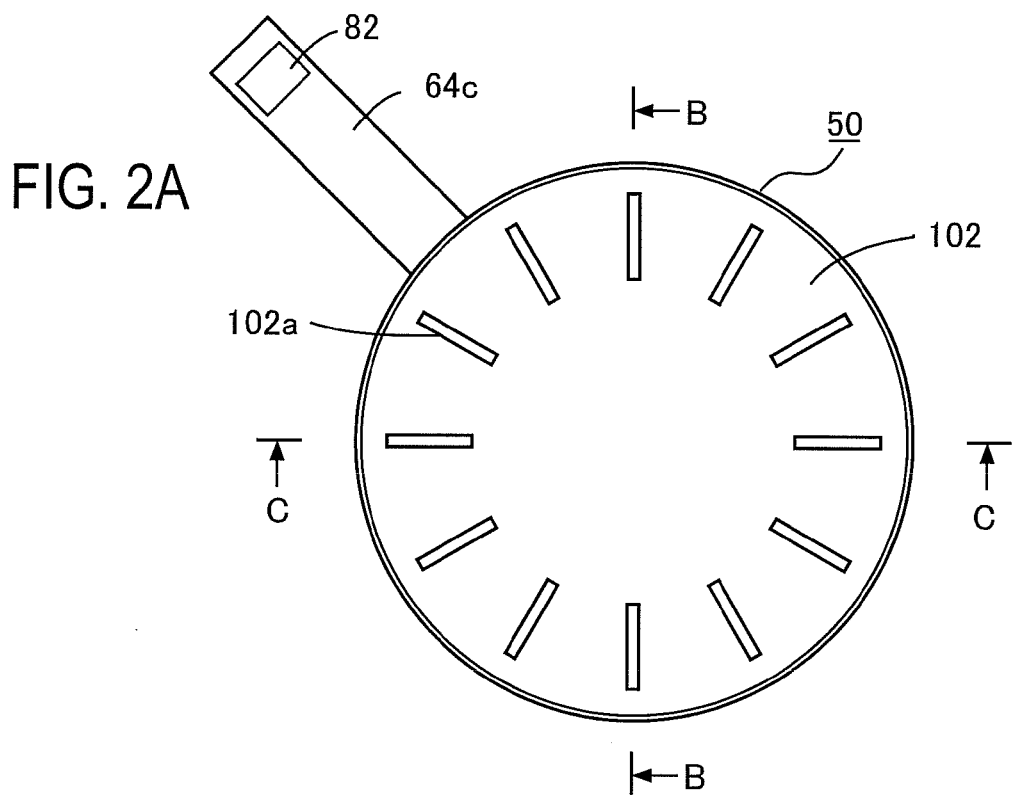
FIG. 2A is a plan view of a rotary input device 50 of the present invention.
Figure 2B:
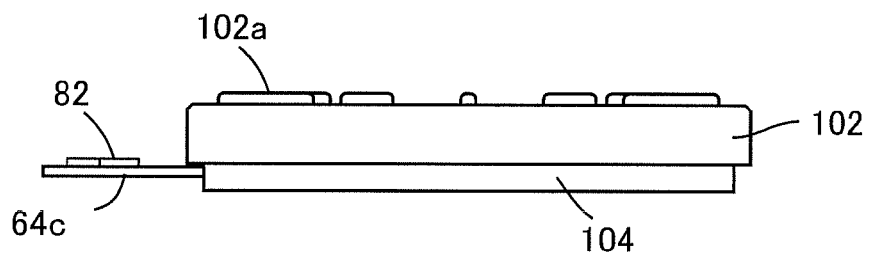
FIG. 2B is its side view.
Figure 2C:
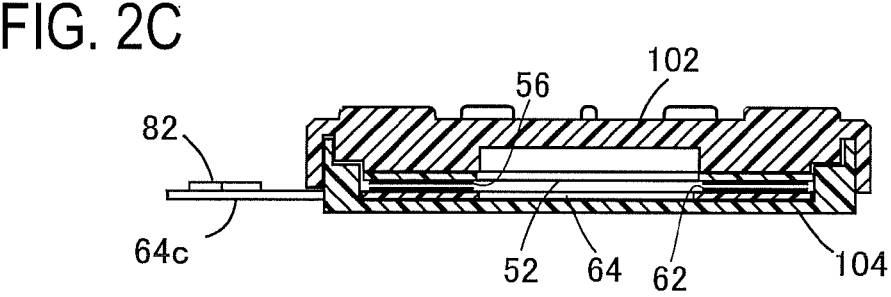
FIG. 2C is its sectional view taken along the line C-C.
Figure 3:
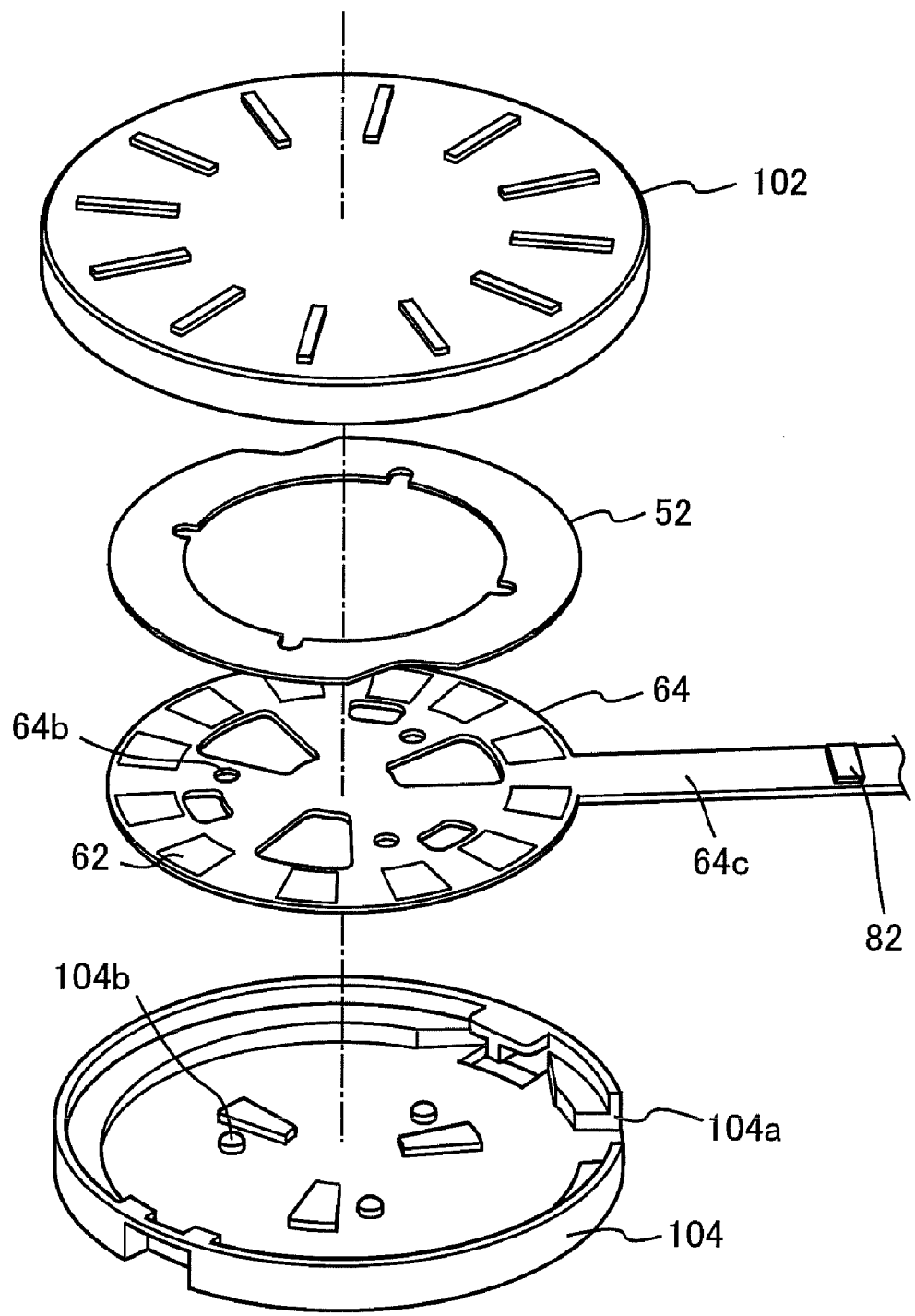
FIG. 3 is a perspective view of the principal part of the rotary input device of FIG. 2, taken from diagonally above.

FIGS. 2A, 2B and 2C are a top plan view of a first embodiment of a rotary input device 50 according to the present invention, its side view, and a sectional view taken along the line C-C, respectively, and FIG. 3 is its exploded perspective view. The rotary input device 50 comprises: an open-topped, shallow cylindrical dish-like casing 104; and a cylindrical lid-like rotary member 102 that is put on the casing 104 from above. The casing 104 and the rotary member 102 are adapted to be able to make sliding contact with each other. On the top surface of the rotary member 102 there are formed radially a plurality of ridges 102a; and the rotary member 102 can easily be turned by pressing its top surface with the ridges formed thereon, for example, with a finger.

A circular phase electrode holding plate 64 is fixed, as by adhesive, to the bottom of the casing 104. At that time, a plurality of positioning lugs 104b formed on the bottom of the casing 104 and a plurality of positioning holes 64b made in the phase electrode holding plate 64 engage with each other to thereby position the phase electrode holding plate 64. A lead-out portion 64c is extended from one sector of the marginal edge of the phase electrode holding plate 64 to the outside through a notch 104a made in the peripheral wall of the casing 104. On the bottom of the rotary member 102 there is fixed, as by adhesive, an annular equally-spaced electrode holding plate 52 of about the same outside diameter as the phase electrode holding plate 64. Accordingly, the equally-spaced electrode holding plate 52 is rotatable with respect to the phase electrode holding plate 64.

The rotary input device of the present invention is intended for use in a capacitance type rotary switch which is particularly suitable as an input device which is built in portable equipment such as a portable telephone, a digital camera, a personal computer, PDA (Personal Digital Assistant), and so forth; when the rotary input device shown in FIGS. 2 and 3 is mounted in such portable equipment, the casing 104 may sometimes be formed as part of the portable equipment. Therefore, the shape of the casing 104 is not always such a circular dish-like one as shown in FIGS. 2 and 3.

On the top of the phase electrode holding plate 64 there are arranged circumferentially thereof a plurality of phase electrodes 62, and on the underside of the equally-spaced electrode holding plate 52, too, there are arranged circumferentially thereof a plurality of equally-spaced electrodes 56. The equally-spaced electrode holding plate 52 and the phase electrode holding plate 64 are opposed but spaced apart to keep the equally-spaced electrodes 56 and the phase electrodes 62 out of contact with each other. The equally-spaced electrodes 56 act as capacitance-forming stray electrodes with respect to the phase electrodes 62. The phase electrodes 62 are connected to a capacitance measuring part 82 on the lead-out portion 64c through lead wires (described later) on the lead-out portion 64c.

Figure 4A:
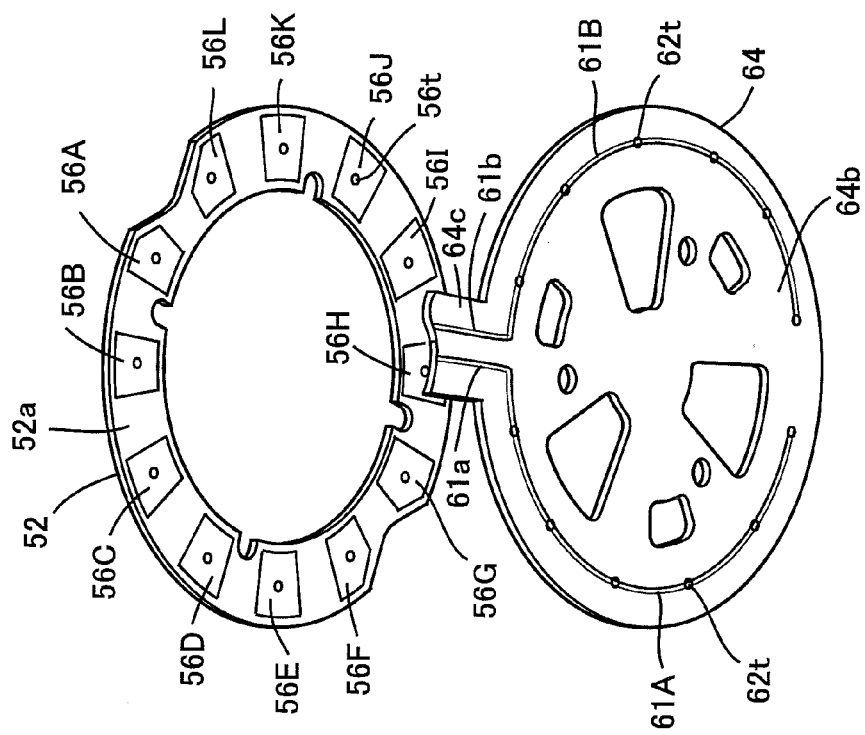
FIG. 4A is a perspective showing the relationship between a phase electrode holding plate and an equally-spaced electrode holding plate, taken from diagonally above.
Figure 4B:
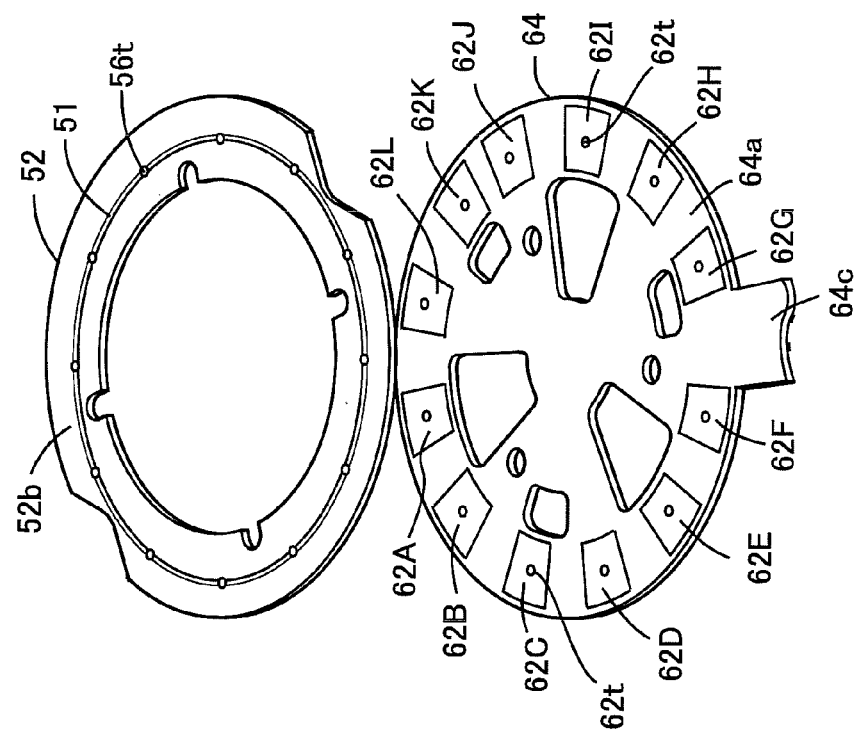
FIG. 4B is a perspective view, taken from diagonally below.

FIGS. 4A and 4B illustrate the configurations of the oppositely disposed equally-spaced electrode holding plate 52 and phase electrode holding plate 64 which constitute the principal part of the rotary input device 50 of the present invention. FIG. 4A is a perspective view showing the equally-spaced electrode holding plate 52 and the phase electrode holding plate 64, taken from diagonally above, and FIG. 4B is a perspective view, taken from diagonally below.

The equally-spaced electrode holding plate 52 has an equally-spaced electrode holding surface 52a facing the phase electrode holding plate 64. The phase electrode holding plate 64 has a phase electrode holding surface 64a facing the equally-spaced electrode holding plate 52. On the equally-spaced electrode holding surface 52a there are held N equally-spaced electrodes (where N is an integer equal to or greater than 2), whereas on the phase electrode holding surface 64a there are held M phase electrodes (where M is an integer equal to or greater than 2). Incidentally, the example of FIG. 4 shows a case where N=M=12, and the equally-spaced electrodes will be identified by 56A to 56L and the phase electrodes by 62A to 62L. Further, in the following description the twelve equally-spaced electrodes will be collectively referred to as equally-spaced electrodes 56 and the twelve phase electrodes as phase electrodes 62 in some cases.

On the surface 52b of the equally-spaced electrode holding plate 52 opposite the equally-spaced electrode holding surface 52a there is formed a ring-like connection line 51. Each equally-spaced electrode 56 is connected by a so-called via-a-hole method to the connection line 51 through a through hole 56t made in the equally-spaced electrode holding plate 52 in the electrode area of the equally-spaced electrode concerned. Thus, the equally-spaced electrodes 56 are all electrically interconnected to form a single floating electrode.

On the other hand, the phase electrodes 62 are divided into two groups of electrodes 62A to 62F and electrodes 62G to 62L in the direction of arrangement; on the surface 64b of the phase electrode holding plate 64 opposite its electrode holding surface 64a there are formed two semicircular arc-shaped connection lines 61A and 61B in opposing relation to the groups of electrodes, respectively. The phase electrodes 62 of the two groups are each connected by the via-a-hole method to the corresponding one of the connection lines 61A and 61B through a through hole 62t made in the phase electrode holding plate 64 in the electrode area concerned. The two connection lines 61A and 61B connected to the two groups are connected to the afore-mentioned capacitance measuring part 82 by lead wires 61a and 61b extended across the lead-out portion 64c from the connection lines at one end thereof.

Figure 5B:
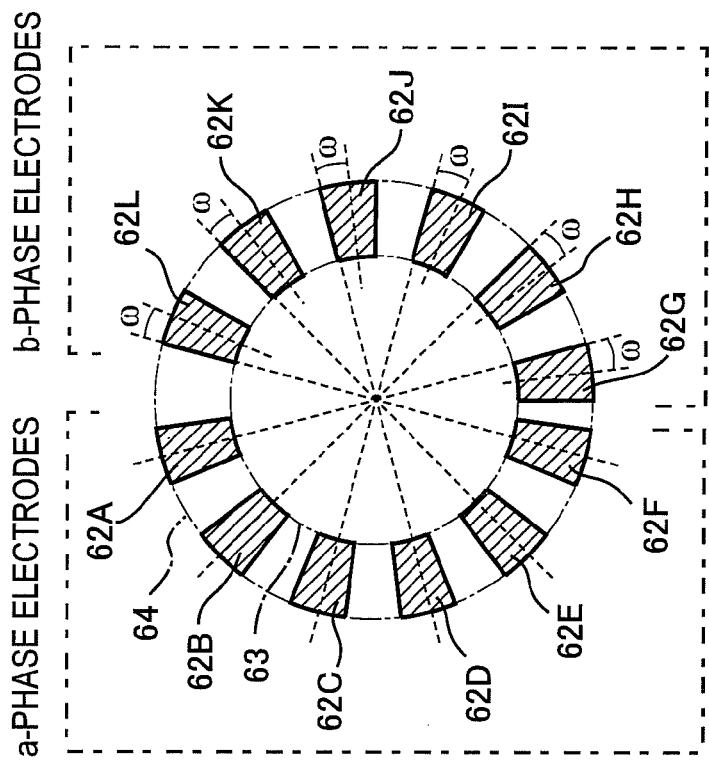
FIG. 5B is a plan view showing the a-phase electrodes in simplified form.
Figure 5A:
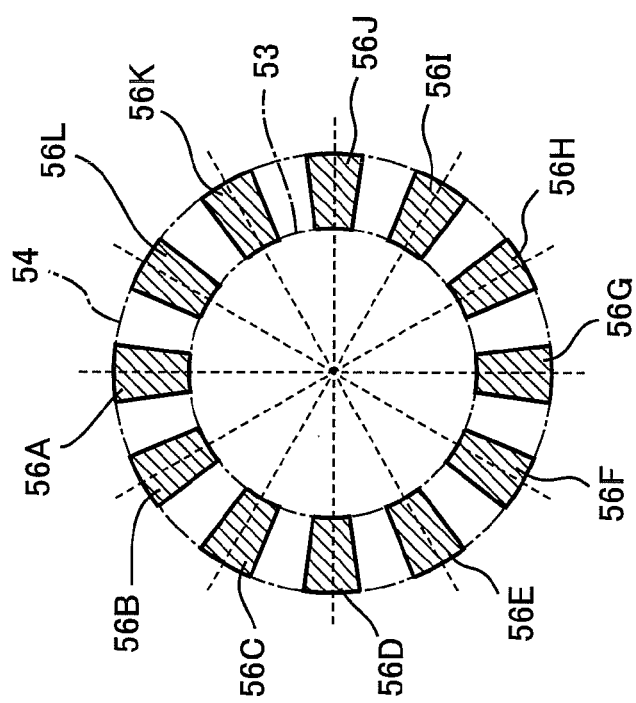
FIG. 5A is a plan view showing the equally-spaced electrodes in simplified form.

FIG. 5A schematically shows the arrangement of the N equally-spaced electrodes formed on the equally-spaced electrode holding surface 52a. The equally-spaced electrodes 56A to 56L are of such geometries that an annular zone defined between two concentric circles 53 and 54 of different diameters is equiangularly and equidistantly cut out to form radially spreading areas. Accordingly, each electrode is shaped as substantially a circular quadrangle (sectoral quadrangle). In the FIG. 5A example with N=12, the angular width of each equally-spaced electrode and the angular spacing between adjacent electrodes in the circumferential direction are equal, i.e., $\pi/12$, but the angular width of each electrode in the circumferential direction may be larger or smaller than $\pi/12$ as long as the pitch angle of arrangement, $2\pi/N$, is maintained.

FIG. 5B shows the arrangement of the phase electrodes 62A to 62L on the phase electrode holding surface 64a. The phase electrodes 62A to 62L are also shaped as substantially circular quadrangles formed by radially dividing an annular zone defined between third and fourth circles 63 and 64 which are equal in diameter to and concentric with the above-mentioned first and second circles 53 and 54, respectively. The phase electrodes 62 are divided into two groups of α a-phase electrodes 62A to 62F and p b-phase electrodes 62G to 62L in the circumferential direction. Here, α and β are each an integer equal to or greater than 1, and M=a+p. In the illustrated example, α=β=M/2=6. In the following description, the a-phase electrodes will be identified by 62A to 62F and the b-phase electrodes by 62G to 62L.

The angular spacing of the arrangement (pitch) of the phase electrodes in each group is the same as in the case of the equally-spaced electrodes. Each phase electrode has the same angular width of the circular arc in the circumferential direction, and in the example of FIG. 5B the angular width of the circular arc of the gap between adjacent phase electrodes in each group is also equal to the angular width of the phase electrode. In some cases in the following description the a-phase electrodes 62A to 62F will be genetically called a-phase electrodes and identified by 62a and the b-phase electrodes 62G to 62L will be genetically called b-phase electrodes and identified by 62b.

Next, a description will be given of the positional relationship between the a-phase electrode and the b-phase electrode. As shown in FIG. 5B, the angular positions of the center lines of the b-phase electrodes 62G to 62L are the positions respectively shifted in the same direction by an angle ω from 2 mπ/N, where 0<ω<π/N, with respect to a desired one of six center lines passing through the centers of the first and second circles 63 and 64 and symmetrically dividing the a-phase electrodes 62A and 62F, respectively (here, M=N=12 as mentioned previously). That is, provision is made to prevent that the angle from the angular position of the equally-spaced electrode holding plate 52 where the equally-spaced electrodes completely coincide with the a-phase electrodes 62a to the angle of the equally-spaced electrode holding plate 52 when the equally-spaced electrodes 62b completely coincide with the b-phase electrodes is an integral multiple (including 0, too) of π/N. A particular value like π/N is used to explain for better understanding, but such a value is a theoretical one. In practice, it is needless to say that an error is contained within a permissible limit defined by the precision called for the rotary input device. The same thing can be said in the following description. By displacing the arrangement of the b-phase electrodes 62b through ω in the same direction from the arrangement of the a-phase electrodes 62a as mentioned above, it is possible to detect the rotation direction of the equally-spaced electrode holding plate 52. The reason for this will be described later on.

While in the above the equally-spaced electrodes and the phase electrodes have been described to be equal in number, they may be different in number. Further, the diameters of the first and second circles 53, 54 and the diameters of the third and fourth circles 63, 64 have been described to be equal to each other, but they need not to be equal in diameter when the annular zone defined by the first and second circles 53, 54 and the annular zone defined by the third and fourth circles are concentric and overlap with each other. Incidentally, the plane defined by the first circle 53 (the equally-spaced electrode holding surface 52a) and the plane formed by the third circle 63 (the phase electrode holding surface 64a) are parallel to each other.

FIG. 6 illustrates the usage of the rotary input device according to the present invention. The afore-mentioned a-phase electrode lead wire 61a and b-phase electrode lead wire 61b from the rotary input device 50 are connected to the capacitance measuring part 82, which measures the capacitance developed between the equally-spaced electrode 56 and the a-phase electrode 62a (which capacitance will hereinafter be referred to as a-phase capacitance $C_a$) and the capacitance between the equally-spaced electrode 56 and the b-phase electrode 62b (which capacitance will hereinafter be referred to as b-phase capacitance $C_b$). These analog capacitances are provided to an angle calculating part 84, wherein it is converted to digital values of the rotational angles corresponding to the capacitances, thereafter being output. Optionally, the angle calculating part 84 may detect a phase difference between variations in the a-phase capacitance $C_a$ and in the b-phase capacitance $C_b$ by the rotation of the rotary member, then determine the rotation direction of the rotary member based on whether the phase difference is plus or minus, and output a signal indicating the rotation direction (clockwise, counterclockwise) as a switch signal together with the above-said detected angle of rotation, or singly as the switch signal.

The rotary input device 50, the capacitance measuring part 82 and the angle calculating part 84 constitute a revolution sensor 80; the output signal resulting from the rotation of the rotary member 102 is used as input data to electronic equipment, or as a control signal for moving a cursor on a display part 86 of the electronic equipment, for menu or item selection, for instance. Incidentally, the capacitance measuring part 82 and the angle calculating part 84 can easily be formed by commercially available ICs (Integrated Circuits). The rotary input device 50 may be any of the embodiments or modifications of the rotary input device described later on.

FIG. 7A is a diagram showing overlapping of the a-phase electrode 62A and the equally-spaced electrode 56A. The area indicated by the broken oblique lines is an overlap (hereinafter referred to as an overlapping area $P_a$) of the a-phase electrode 62A and the equally-spaced electrode 56A. The capacitance $C_a'$ generated by the a-phase electrode 62A and the equally-spaced electrode 56A can be expressed by Eq. (2).

$$C_a' = \in \cdot S_a/d \quad (2)$$

In Eq. (2), $\in$ represents the dielectric constant of the space material (air and/or other insulator) present between the phase electrode 62 and the equally-spaced electrode 56. $S_a$ represents the area of the overlapping area $P_a$. d represents the distance between the opposing surfaces of the phase electrode 62 and the equally-spaced electrode 56.

As shown in FIG. 7A, letting the angle formed by the circular arc of the overlapping area $P_a$ (which angle will hereinafter be referred to as the overlapping-area angle) be represented by $\theta_a$, the area $S_a$ of the overlapping area $P_a$ can be expressed by Eq. (3). Here, the radius of the second circle 54 is taken as R and the radius of the first circle 53 as r.

$$S_a = (\pi R^2 - \pi r^2)\theta_a/2\pi \quad (3)$$
$$= \theta_a(R^2 - r^2)/2$$

By substituting Eq. (3) into Eq. (2), the capacitance $C_a'$ can be expressed by Eq. (4).

$$C_a' = \theta_a \in (R^2 - r^2)/2d \quad (4)$$

Of the coefficients in Eq. (4), $\in$, d, R and r are constant. Since this example uses six a-phase electrodes and since the angles $\theta_a$ of their areas overlapping the equally-spaced electrodes are all equal, $C_a = 6C_a'$ holds. Therefore, $$C_a = 3\theta_a \in (R^2 - r^2)/d \quad (5)$$

That is, the capacitance $C_a$ is proportionate to the overlapping-area angle $\theta_a$. Similarly, as shown in FIG. 7B, letting the overlap of the b-phase electrode 62G and the equally-spaced electrode 56G be taken as an overlapping area Pb and the overlapping-area angle of the overlapping area Pb be represented by $\theta_b$, the following equation holds:

$$C_b = 3\theta_b \in (R^2 - r^2)/d \quad (6)$$

From Eq. (6) the capacitance $C_b$ is proportionate to the overlapping-area angle $\theta_b$.

FIGS. 8A to 8D show four states S1 to S4 in which the equally-spaced electrode holding plate 52 in FIGS. 4A and 4B has been turned clockwise with respect to the phase electrode holding plate 64. FIG. 8E is a graph showing capacitance changes with the rotation of the equally-spaced electrode holding plate 52. The ordinate represents the capacitance C and the abscissa represents time. The a-phase capacitance $C_a$ is indicated by the solid line and the b-phase capacitance $C_b$ by the broken line. The states S1 to S4 correspond to the four states S1 to S4 shown in FIGS. 8A to 8D.

When the equally-spaced electrode 56 and the a-phase electrode 62a are completely opposed to each other, $\theta_a = \pi/12$ in this example; similarly, when the equally-spaced electrode 56 and the b-phase electrode 62b are completely opposed to each other, $\theta_b = \pi/12$. The capacitances $C_a$ and $C_b$ in these cases will be denoted by $C_1$.

In the case of the state S1 depicted in FIG. 8A, one-half areas of the respective a-phase electrodes 62A to 62F overlap the equally-spaced electrodes 56A to 56F. Therefore, the a-phase capacitance $C_a$ comes to $C_1/2$. On the other hand, since all of the b-phase electrodes 62G to 62L entirely overlap corresponding ones of the equally-spaced electrodes 56, the b-phase capacitance $C_b$ comes to $C_1$.

The state S2 shown in FIG. 8B is the state in which the equally-spaced electrodes 56 in the state S1 have been turned clockwise through $\pi/24$. In the state S2 the a-phase electrodes 62A to 62F entirely overlap corresponding ones of the equally-spaced electrodes 56. Therefore, the a-phase capacitance $C_a$ is $C_1$. On the other hand, one-half areas of the respective b-phase electrodes 62G to 62L overlap one of the equally-spaced electrodes 56. Therefore, the b-phase capacitance $C_b$ is $C_1/2$. The state S3 shown in FIG. 8C is the state in which the equally-spaced electrodes 56 in the state S2 have been turned clockwise through $\pi/24$. In the state S3 one-half areas of the respective a-phase electrodes 62A to 62F overlap corresponding ones of the equally-spaced electrodes 56. Therefore, the a-phase capacitance $C_a$ is $C_1/2$. On the other hand, the b-phase electrodes 62G to 62L do not overlap at all the equally-spaced electrodes 56. Therefore, the b-phase electrode capacitance $C_b$ is zero.

The state S4 shown in FIG. 8D is the state in which the equally-spaced electrodes 56 in the state S3 have been turned clockwise through $\pi/24$. In the state S4 the a-phase electrodes 62A to 62F and the equally-spaced electrodes 56 do not overlap at all. Therefore, the a-phase capacitance $C_a$ is zero. On the other hand, one-half areas of the respective b-phase electrodes 62G to 62L overlap corresponding ones of the equally-spaced electrodes 56. Therefore, the b-phase electrode capacitance $C_b$ is $C_1/2$.

As described above, the capacitance C is proportionate to the overlapping-area angle $\theta$. Accordingly, the capacitances $C_a$ and $C_b$ theoretically ought to take triangular waveforms which linearly increase and decrease with the rotation of the equally-spaced electrode holding plate 52, but in actuality, under the influence of the accuracy of electrode patterns or stray capacitance between the electrodes and surrounding objects the waveforms become round at the maximum and minimum points and in their neighborhoods as indicated by $H_1$ and $H_2$ in FIG. 8E.

The capacitance measuring part 82 outputs signals corresponding to such capacitances $C_a$, $C_b$ as shown in FIG. 8E. In the example of FIG. 8E, when the phase of the change in the a-phase capacitance $C_a$ leads the phase of the change in the b-phase capacitance $C_b$, the angle calculating part 84 in FIG. 6 can detect a counterclockwise rotation. Further, when the phase of the change in the a-phase capacitance $C_a$ lags the phase of the change in the b-phase capacitance $C_b$, the angle calculating part 84 can detect a clockwise rotation.

Figure 9A:
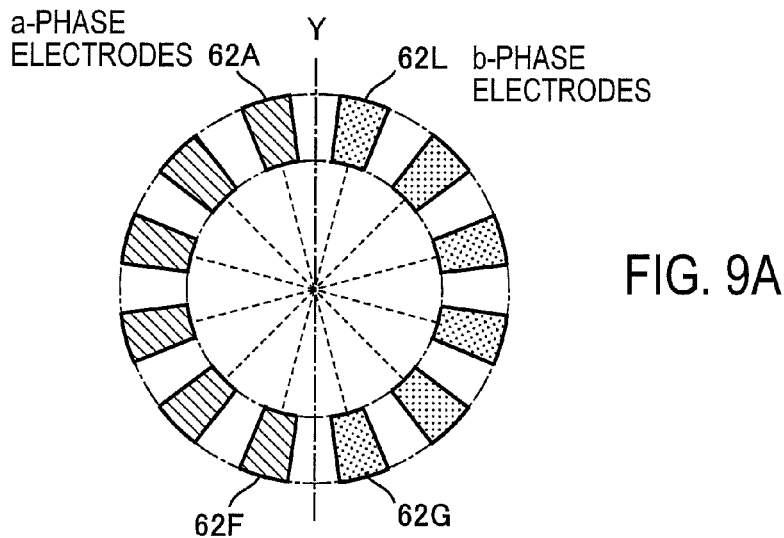
FIG. 9A is a diagram showing the arrangement of the phase electrodes when the b-phase electrodes are displaced an even-numbered multiple of π/N in the direction of rotation with respect to the a-phase electrode.

However, when the a-phase electrodes 62A to 62F and the b-phase electrodes 62G to 62L are at positions displaced in the same circumferential direction through an angle of an integral multiple of $\pi/N$, the angle calculating part 84 cannot detect the rotation direction of the equally-spaced electrode holding plate 52. For example, when the a-phase electrodes 62A to 62F and the b-phase electrodes 62G to 62L are displaced in the same circumferential direction through an even multiple of $\pi/N$, the a-phase electrodes 62A to 62F and the b-phase electrodes 62G to 62L assume such positions as shown in FIG. 9A. That is, the a-phase electrodes and the b-phase electrodes lie symmetrically about a straight line Y (indicated by the one-dot chain line) bisecting the phase electrode holding plate radially thereof.

Figure 9B:
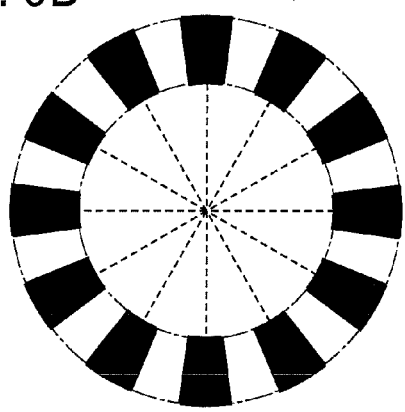
FIG. 9B is a diagram showing a first state S1 of the relationship between the equally-spaced electrodes and the phase electrodes in FIG. 9A.
Figure 9C:
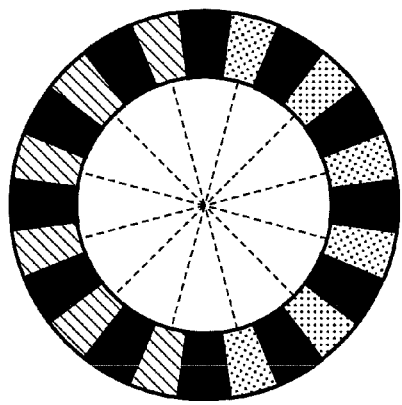
FIG. 9C is a diagram showing a second state S2.
Figure 9D:
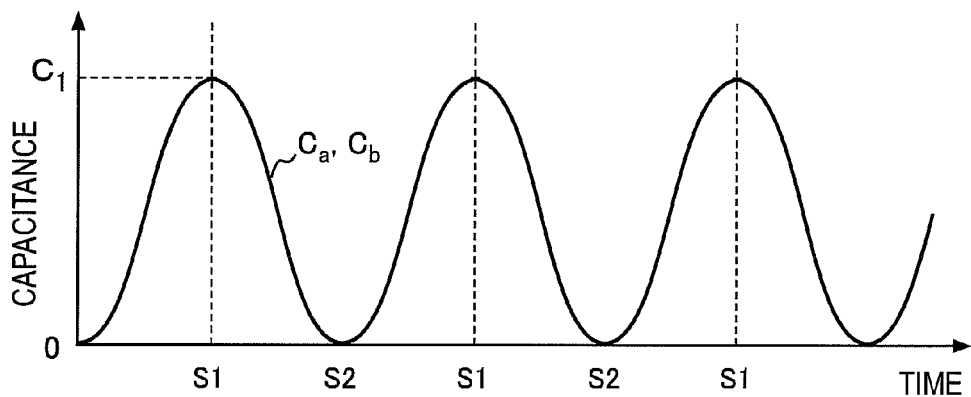
FIG. 9D is a graph showing capacitance variations in this case.

In the state S1 shown in FIG. 9B, the equally-spaced electrodes 56A to 56L are all opposed over the entire areas thereof to the phase electrodes 62A to 62L. Accordingly, the a-phase capacitance $C_a$ and the b-phase capacitance $C_b$ both reach the maximum value $C_1$. Next, let S2 represent the state in which the equally-spaced electrode holding plate 52 has been turned clockwise through $\pi/12$ with respect to the phase electrode holding plate 64 as depicted in FIG. 9C. In the state S2, since the equally-spaced electrodes 56A to 56L do not overlap at all the phase electrodes 62A to 62L, the a-phase capacitance $C_a$ and the b-phase capacitance $C_b$ both become the minimum value 0. Accordingly, the a-phase capacitance $C_a$ and the b-phase capacitance $C_b$ to be measured in the capacitance measuring part 82 always coincide as shown in FIG. 9D. Even if the angle measuring part 84 receives such a change of the capacitances $C_a$ and $C_b$ as shown in FIG. 9D, it cannot detect the rotation direction.

Figure 10A:
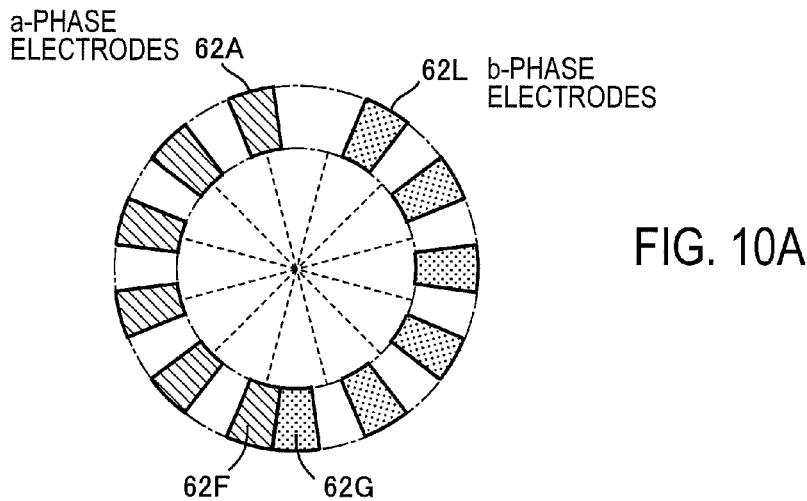
FIG. 10A is a diagram showing the arrangement of the phase electrodes when the b-phase electrodes are displaced an even numbered multiple of π/N in the direction of rotation with respect to the a-phase electrode.

Further, when the a-phase electrodes 62A to 62F and the b-phase electrodes 62G to 62L are shifted in the same circumferential direction through an odd multiple of $\pi/N$, the a-phase electrodes 62A to 62F and the b-phase electrodes 62G to 62L are arranged as shown in FIG. 10A.

Figure 10B:
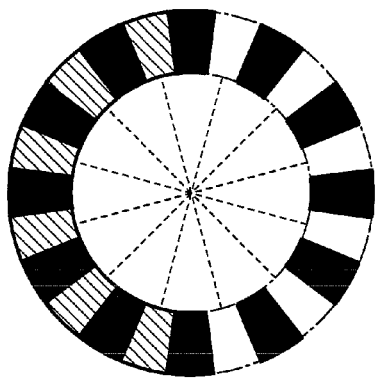
FIG. 10B is a diagram showing a first state S1 of the relationship between the equally-spaced electrodes and the phase electrodes in FIG. 10A.
Figure 10C:
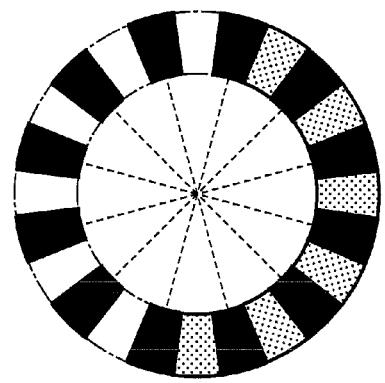
FIG. 10C is a diagram showing a second state S2.

In the state S1, since the a-phase electrodes 62A to 62F and the equally-spaced electrodes do not overlap at all as depicted in FIG. 10B, the a-phase capacitance $C_a$ goes to 0. On the other hand, since the b-phase electrodes 62G to 62L are all opposed over the entire areas thereof to the equally-spaced electrodes, the b-phase capacitance $C_b$ comes to $C_1$. Further, FIG. 10C shows the state S2 in which the equally-spaced electrode holding plate 52 has been turned clockwise through $\pi/12$. In the state S2, since the a-phase electrodes 62A to 62F are all opposed over the entire areas thereof to the equally-spaced electrodes, the a-phase capacitance $C_a$ comes to $C_1$. On the other hand, since the b-phase electrodes 62G to 62L do not overlap at all the equally-spaced electrodes, the b-phase capacitance $C_b$ is 0.

Figure 10D:
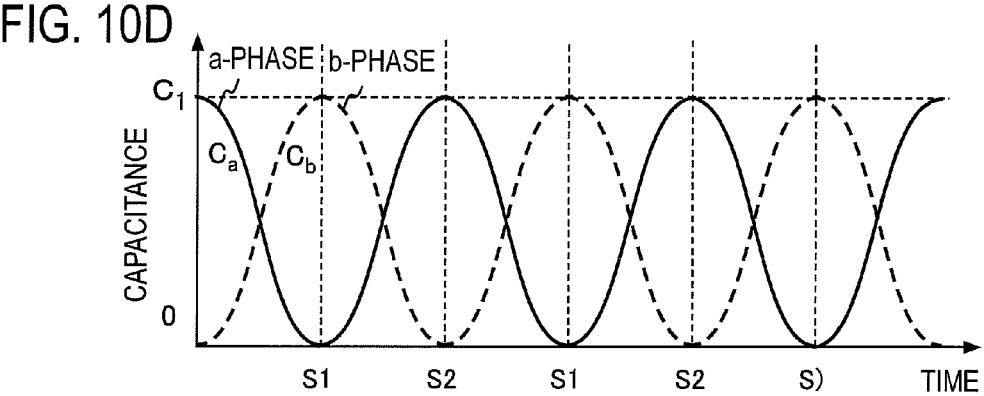
FIG. 10D is a graph showing capacitance variations in this case.

Accordingly, the a-phase capacitance $C_a$ and the b-phase capacitance $C_b$ to be measured in the capacitance measuring part 82 both become such as shown in FIG. 10D. Even if the angle calculating part 84 receives such changes of the capacitances $C_a$ and $C_b$ as shown in FIG. 10D, it cannot detect the rotation direction because the capacitance changes are phased $\pi$ apart.

As described above, when the a-phase electrodes 62A to 62F and the b-phase electrodes 62G to 62L are at positions displaced an angle of an integral multiple of $\pi/N$ apart in the same circumferential direction, the angle calculating part 84 cannot detect the rotation direction of the equally-spaced electrode holding plate 52. On the contrary, by preventing the a-phase electrodes 62A to 62F and the b-phase electrodes 62G to 62L from assuming the positions displaced an angle of an integral multiple of $\pi/N$ apart in the same circumferential direction, a phase difference, which is neither 0 nor the integral multiple of $\pi$, arises between the change of the capacitance $C_a$ and the change of the capacitance $C_b$ which depend on the rotation direction. It is possible to recognize the direction of rotation according as the phase difference is plus or minus.

Next, a description will be given of the detection of the rotation angle. FIG. 11A shows changes of the capacitances $C_a$ and $C_b$ in the case where the equally-spaced electrode holding plate 52 has been turned through $2\pi$.

First, the values of the a-phase capacitance $C_a$ and the b-phase capacitance $C_b$ are digitized. To be more specific, letting the capacitance $C_1/2$ be used as a threshold value $\gamma$, the value of the capacitance is made a "1" or "0" depending on whether it is larger or smaller than the threshold value $\gamma$. Then, the pulse waveform shown in FIG. 11B can be derived from the a-phase capacitance, and the one-pulse period corresponds to the rotation angle $\pi/6$ of the equally-spaced electrode holding plate 52. Accordingly, the angle calculating part 84 can detect the rotation angle by counting the number of pulses. Incidentally, FIG. 11C shows the pulse waveform generated by digitization of the b-phase capacitance $C_b$.

That is, as in this embodiment, the a-phase electrodes 62a are arranged at positions displaced an angle of an integral multiple of $2\pi/N$ apart in the rotation direction, and the b-phase electrodes 62b are also arranged at positions displaced an angle of an integral multiple of $2\pi/N$ apart in the rotation direction. Further, the relationship between the angular positions of the a-phase electrode and the b-phase electrode is selected such that the angle from the angular position of the equally-spaced electrode holding plate 52 where the equally-spaced electrode and the a-phase electrode overlap most to the angular position of the equally-spaced electrode holding plate 52 where the equally-spaced electrode and the b-phase electrode overlap most is not an integral multiple of $\pi/N$. In other words, the b-phase electrode arrangement is determined relative to the a-phase electrode arrangement such that the angle from the angular position of a given one of the a-phase electrode to a given one of the b-phase electrodes in the same circumferential direction is not an integral multiple of $\pi/N$. With such an arrangement, the angle calculating part 84 will be able to detect the rotation direction and the rotation angle from the relationship between $C_a$ and $C_b$.

First Modification

Figure 12A:
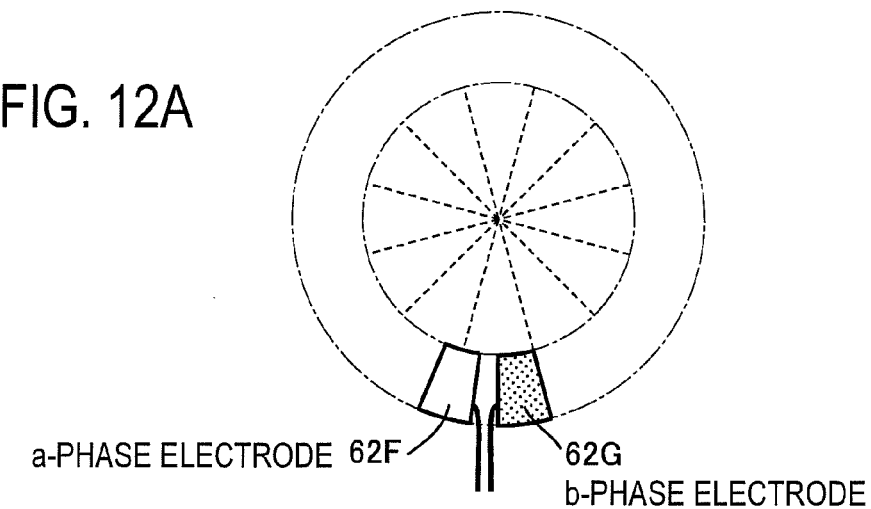
FIG. 12A is a diagram showing a configuration in which the a-phase and b-phase electrodes are provided one for each.
Figure 12B:
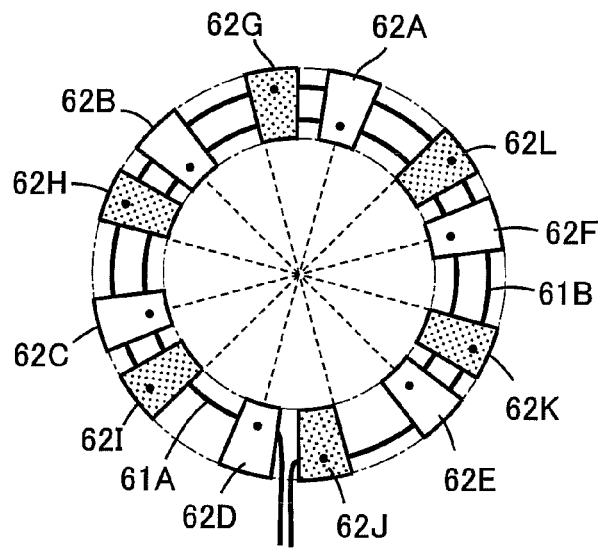
FIG. 12B is a diagram showing a configuration in which the a-phase electrodes and the b-phase electrodes are disposed alternately with each other.
Figure 12C:
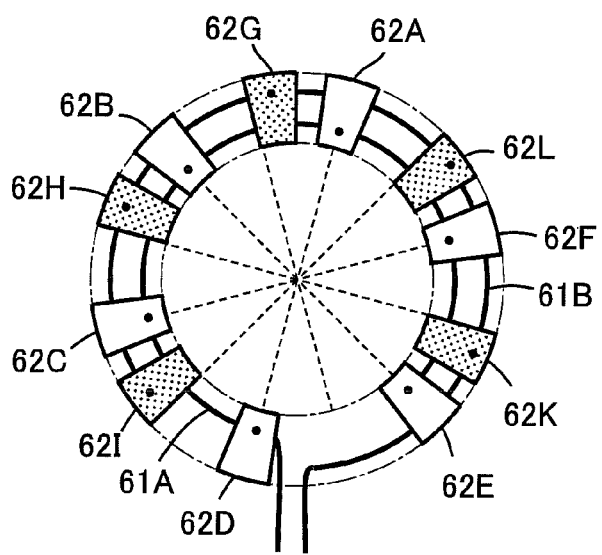
FIG. 12C is a diagram showing a configuration in which the a-phase electrodes and the b-phase electrodes of different numbers are arranged.

Next, a description will be given of a modification of First Embodiment. FIGS. 12A to 12C show in simplified form the arrangements of the a-phase electrode and the b-phase electrode in three kinds of modifications of the phase electrode holding plate 64.

As depicted in FIG. 12A, the a-phase electrode and the b-phase electrode can be made one for each (designated by 62F and 62G in FIG. 12A). In this case, the problem arises that the values of the a-phase capacitance $C_a$ and the b-phase capacitance $C_b$ to be measured in the capacitance measuring part 82 are small. However, this configuration may be used when high accuracy of measurement is not needed.

The a-phase electrodes and the b-phase electrodes may also be arranged alternately with each other as depicted in FIG. 12B. Also in this case, the a-phase electrodes are electrically interconnected one another by the connection line 61A and the b-phase electrodes are electrically interconnected one another by the connection line 61B, and the a-phase electrodes and the b-phase electrodes are not electrically connected to each other. In this instance, since the a-phase capacitance $C_a$ and the b-phase capacitance $C_b$ both vary as shown in FIG. 11A, the angle calculating part 84 can detect the rotation angle and the rotation direction.

It is also possible to use different numbers of a-phase electrodes and b-phase electrodes as depicted in FIG. 12C. In the example of FIG. 12C, the number of b-phase electrodes is smaller than the number of a-phase electrodes by one, and the a-phase electrodes and the b-phase electrodes are disposed alternately with each other. In this instance, as shown in FIG. 13A, the maximum value $C_{amax}$ of the capacitance $C_a$ of the a-phase electrode becomes greater than the capacitance $C_{bmax}$ of the b-phase electrode. Even in such a case, by setting the threshold value $\gamma_a$ of the a-phase capacitance at $C_{amax}/2$ and the threshold value $\gamma_b$ of the b-phase electrode at $C_{bmax}/2$, it is possible to correctly detect the phases of digital values of the capacitances $C_a$ and $C_b$ as depicted in FIGS. 13B and 13C. Accordingly, the angle calculating part 84 is capable of detecting the rotation angle as well.

Second Modification

Figure 14:
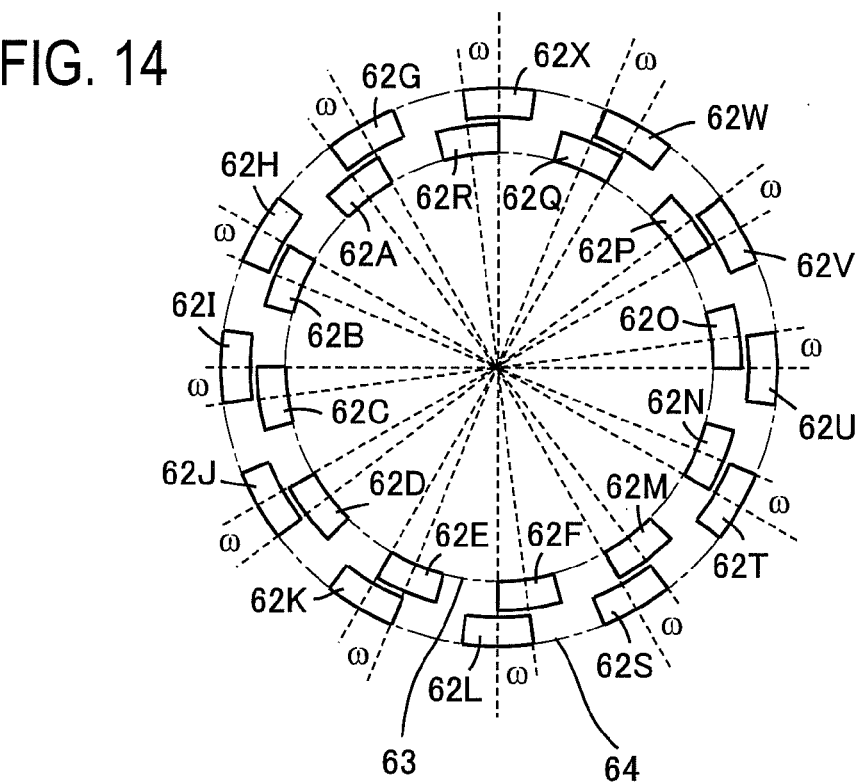
FIG. 14 is a plan view showing in simplified form a phase electrode holding plate in Modification 2.

FIG. 14 is a plan view showing in simplified form a modification of the phase electrodes 62 mounted on the phase electrode holding plate 64 in First Embodiment. As depicted in FIG. 14, the a-phase electrodes are equiangularly arranged at positions where they circumscribe the third circle 63, and the b-phase electrodes are equiangularly arranged at positions where they are inscribed in the fourth circle 64. In this instance, the equally-spaced electrode holding plate 52 may be the same as shown in FIG. 5A.

In the FIG. 14 example, the above-mentioned a-phase electrodes 62A to 62F and b-phase electrodes 62G to 62L are added with six a-phase electrodes 62M to 62R and six b-phase electrodes 62S to 62X, respectively. That is, the a-phase electrodes and the b-phase electrodes are both 12. The arrangement of the b-phase electrodes is circumferentially displaced $\omega$, where $0<\omega<\pi/N$, with respect to the equiangular arrangement of the a-phase electrodes. N is the number of equiangularly spaced electrodes, and in this example N=12. The sum of the radial width of the a-phase electrode and the radial width of the b-phase electrode is made smaller than the width of the annular zone between the circles 63 and 64, and consequently, the a-phase electrode and the b-phase electrode are not in contact with each other in the radial direction.

If necessary, the radial widths of the a-phase and b-phase electrodes may be selected such that the area of each a-phase electrode is equal to the area of the corresponding one of the b-phase electrodes, or it is also possible to make their radial widths equal and determine the threshold values $\gamma_a$ and $\gamma_b$ for the capacitances being detected, in accordance with the areas of the electrodes as described above in respect of FIG. 13. In the FIG. 14 modification, the a-phase electrodes are located further inside than the b-phase electrodes, but the a-phase electrodes may be disposed further outside than the b-phase electrodes. Though not shown, adjacent a-phase electrodes and adjacent b-phase electrodes are electrically interconnected, respectively, but the a-phase electrodes and the b-phase electrodes are not electrically connected to each other.

As described above, the a-phase electrodes and the b-phase electrodes are arranged so that the angle from the angular position of the equally-spaced electrode holding plate 52 in FIG. 5A where the equally-spaced electrodes 56A to 56L coincide most with the a-phase electrodes 62A to 62F and 62M to 62R to the angular position of the equally-spaced electrodes 56A to 56L coincide most with the b-phase electrodes 62G to 62L and 62S to 62X is not an integral multiple (including 0) of π/N. Such an electrode arrangement also produces the same effects as are obtainable with First Embodiment.

Third Modification

Figure 15:
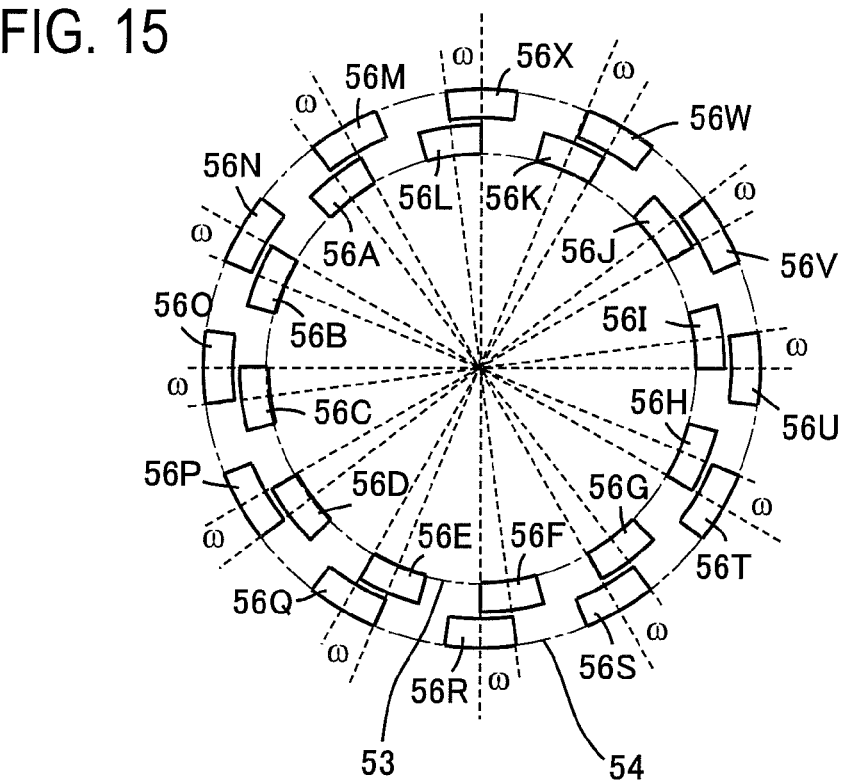
FIG. 15 is a plan view showing in simplified form equally-spaced electrodes of an equally-spaced electrode holding plate in Modification 3.
Figure 16:
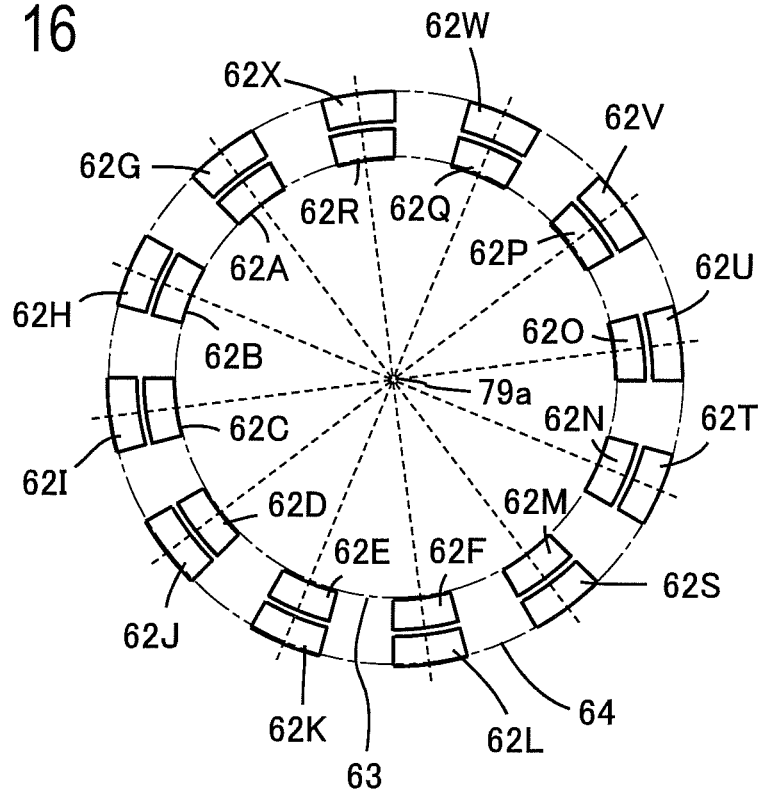
FIG. 16 is a plan view showing in simplified form equally-spaced electrodes of an equally-spaced electrode holding plate in Modification 3.

FIG. 15 illustrates in simplified form a modification of the arrangement of the equally-spaced electrodes 56 on the equally-spaced electrode holding plate 52 in First Embodiment, and FIG. 16 illustrates in simplified form the arrangement of the phase electrodes 62 formed on the phase electrode holding plate 64 in correspondence to the equally-spaced electrodes 56.

On the equally-spaced electrode holding plate 52 there are mounted 12 equally-spaced electrodes 56M to 56X in addition to the 12 equally-spaced electrodes 56A to 56L, that is, a total of 24 equally-spaced electrodes 56A to 56X. In this example, 12 first equally-spaced electrodes 56A to 56L are equiangularly arranged at positions where they circumscribe the first circle 53, and 12 second equally-spaced electrodes 56M to 56X are equiangularly arranged at positions where they are inscribed in the second circle 54 concentric with the first circle 53. The arrangement of the first equally-spaced electrodes 56A to 56L and the arrangement of the second equally-spaced electrodes 56M to 56X are radially spaced apart, but the first and second equally-spaced electrodes are all electrically interconnected via connection lines not shown.

As depicted in FIG. 15, the arrangement of the second equally-spaced electrodes 56M to 56X is circumferentially displaced through ω (0<ω<π/N) apart from the arrangement of the first equally-spaced electrodes 56A to 56L. That is, this configuration is the same as that in which the a-phase electrodes and the b-phase electrodes, described in Second Modification (FIG. 14), are replaced with the first equally-spaced electrodes and the second equally-spaced electrodes, respectively.

The phase electrodes 56 on the phase electrode holding plate 64, which correspond to the equally-spaced electrode arrangement shown in FIG. 15, are formed by 12 a-phase electrodes 62A to 62F, 62M to 62R and 12 b-phase electrodes 62G to 62L, 62S to 62X as depicted in FIG. 16. The 12 a-phase electrodes 62A to 62F and 62M to 62R, which have the same radial width as do the first equally-spaced electrodes 56A to 56L, are equiangularly arranged at positions where they circumscribe the third circle 63 of the same diameter as that of the first circle 53. The 12 b-phase electrodes 62G to 62L and 62S to 62X, which have the same radial width as do the second equally-spaced electrodes 56M to 56X, are equiangularly arranged at positions where they are inscribed in the fourth circle 64 of the same diameter as that of the second circle 54, and are disposed at the same circumferential angular positions as those of the a-phase electrodes 62A to 62F and 62M to 62R.

With the arrangements of the equally-spaced electrodes and the phase electrodes depicted in FIGS. 15 and 16, the angle of the equally-spaced electrode holding plate 52 from the angular position where the first equally-spaced electrodes 56A to 56L and the a-phase electrodes 62A to 62F and 62M to 62R coincide most with each other to the angular position where the second equally-spaced electrodes 56M to 56X and the b-phase electrodes 62G to 62L and 62S to 62X coincide most with each other becomes an angle different from an integral multiple of π/N. Such electrode arrangement also produces the same effects as are obtainable with First Embodiment.

Fourth Modification

Figure 17:
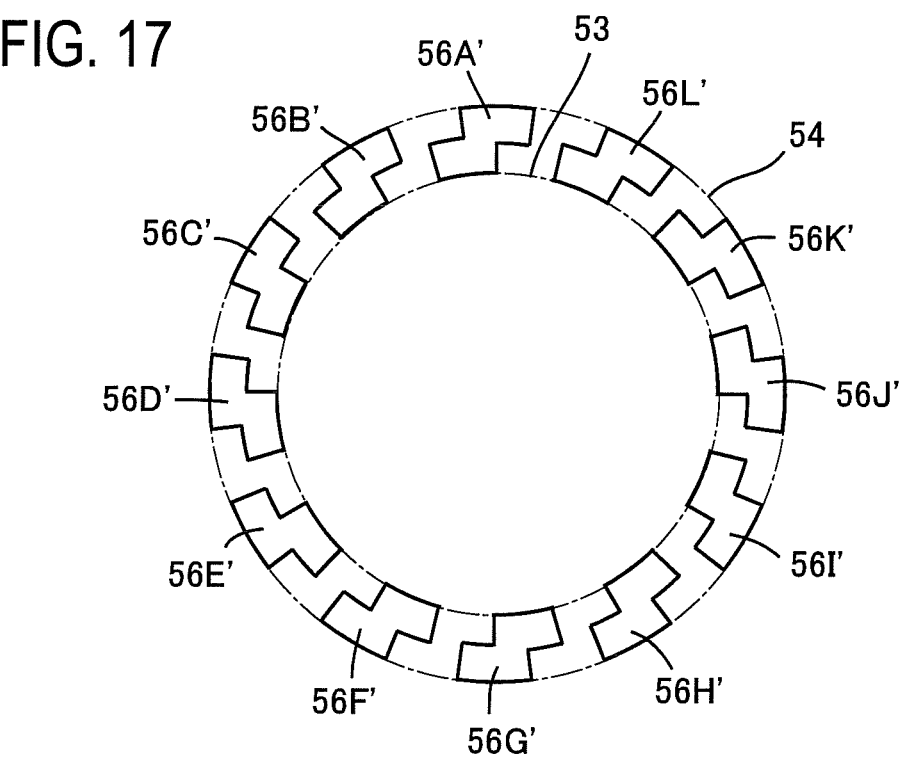
FIG. 17 is a diagram showing the arrangement of equally-spaced electrodes 56 in Modification 4.

FIG. 17 illustrates unitary-structured equally-spaced electrodes 56A' to 56L' formed by increasing the radial widths of the first equally-spaced electrodes 56A to 56L and the second equally-spaced electrodes 56M to 56X in the Third Modification shown in FIG. 15, so that their opposing circular arcs overlap with each other. The phase electrodes corresponding to the equally-spaced electrodes 56A' to 56L' may be those shown in FIG. 16. This modification also produces the same effects as are obtainable with First Embodiment.

Fifth Modification

Third Modification, shown in FIGS. 14 and 15, has been described as having a configuration wherein the first equally-spaced electrodes 56A to 56L and the second equally-spaced electrodes 56M to 56X are arranged flush with each other, and the a-phase electrodes 62A to 62F, 62M to 62R and the b-phase electrodes 62G to 62L, 62S to 62X are arranged flush with each other. But these four electrode arrangements may be located all in different planes. The Fifth Modification shown in FIG. 18 is an example of such a configuration.

Figure 18:
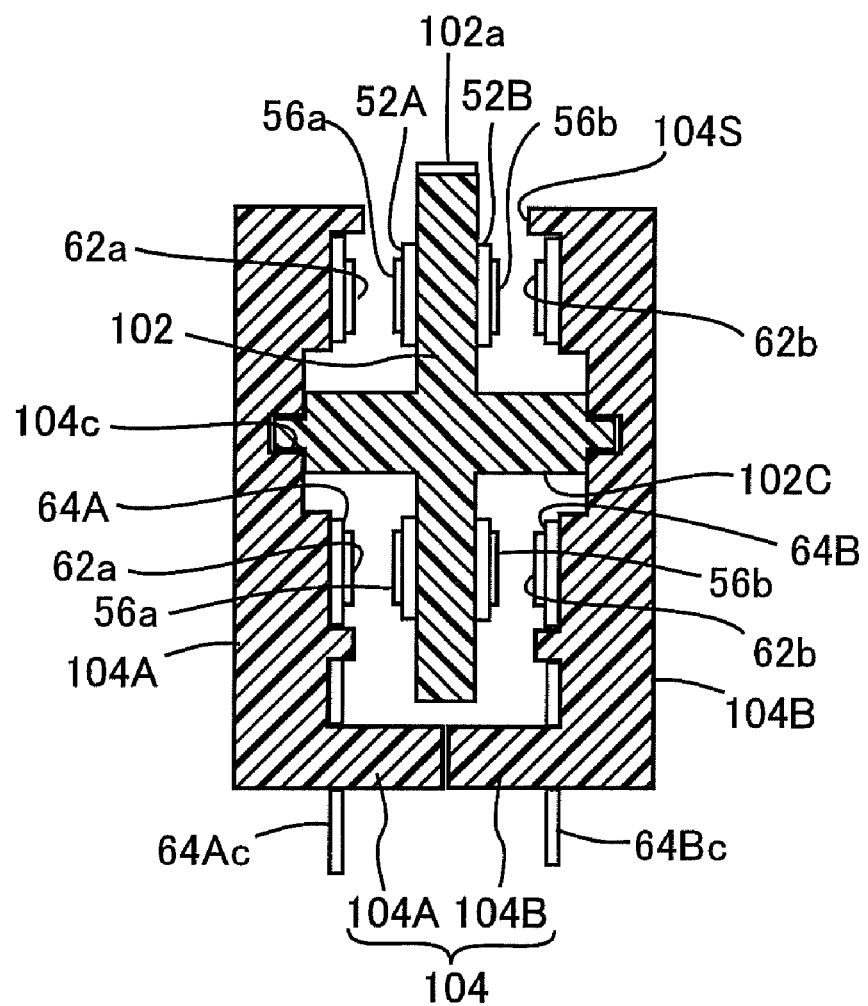
FIG. 18 is a sectional view of a rotary input device of Modification 5.

The modification depicted in FIG. 18 can be used as a rotary input device such as a mouse wheel. In the rotary input device, as shown in the sectional view shown in FIG. 18, a disc-like rotary member 102 having a rotary shaft 102C is received between casing side walls 104A and 104B, the rotary shaft 102C being rotatably supported by bearing holes 104c made in the interior wall surface of the casing side walls 104A and 104B. The outer periphery of the rotary member 102 projects out through a slit 104S defined between opposing marginal edges of the side walls 104A and 104B. On the outer peripheral surface of the rotary member 102 there are equiangularly spaced ridges 102a extending in parallel relation to the rotary shaft. The a-phase electrodes 62A to 62F and 62M to 62R, shown in FIG. 14, are formed as a-phase electrodes 62a on the top surface of a circular a-phase electrode holding plate 64A fixed to the inner wall surface of the casing side wall 104A in FIG. 18. The b-phase electrodes 62G to 62L and 62S to 62X, shown in FIG. 14, are formed as b-phase electrodes 62b on the top surface of a circular b-phase electrode holding plate 64B fixed to the inner wall surface of the casing side wall 104B.

On the other hand, the first equally-spaced electrodes 56A to 56L, shown in FIG. 15, are formed as first equally-spaced electrodes 56a on the top surface of an annular first equally-spaced electrode holding plate 52A fixed to the disc-shaped rotary member 102 on the side of the casing side wall 104A. Further, the second equally-spaced electrodes 56M to 56X, shown in FIG. 15, are formed as first equally-spaced electrodes 56b on the top surface of an annular second equally-spaced electrode holding plate 52B fixed to the disc-shaped rotary member 102 on the side of the casing side wall 104B.

The arrangement of the first equally-spaced electrodes 56a and the arrangement of the a-phase electrodes 62a face each other in parallel relation on the circumferences of the same diameter centered on the center line of the rotary shaft 102C, and the arrangement of the second equally-spaced electrodes 56b and the arrangement of the b-phase electrodes 62b face each other in parallel relation on the circumferences of the same diameter as the above-mentioned and centered on the center line of the rotary shaft 102C. A connection line, not shown, interconnecting all the a-phase electrodes extends across a lead-out portion 64Ac extended from the outer periphery of the a-phase electrode holding plate 64A for outer connection. Similarly, a connection line, not shown, interconnecting all the b-phase electrodes extends across a lead-out portion 64Bc extended from the outer periphery of the b-phase electrode holding plate 64B for outer connection.

In this modification, too, the electrodes are arranged so that the angle from angular position of the rotary member 102 where the first equally-spaced electrodes and the a-phase electrodes coincide most with each other to the angular position of the rotary member 102 where the second equally-spaced electrodes and the b-phase electrodes coincide most with each other is not an integral multiple of $\pi/N$; hence, it is possible to obtain the same effects as are obtainable with First Embodiment.

Second Embodiment

Figure 19A:
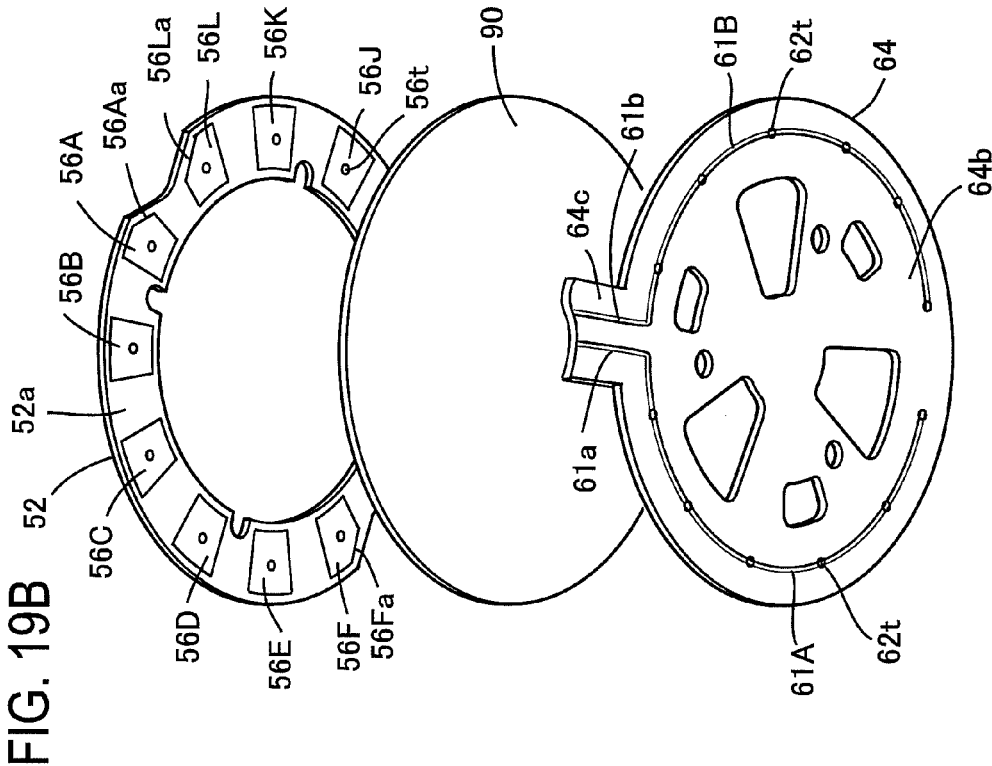
FIG. 19A is a perspective view taken from above of the principal part of a rotary input device 50 having a spacer 90 intervened between the equally-spaced electrode holding plate 52 and the phase electrode plate 64.
Figure 19B:
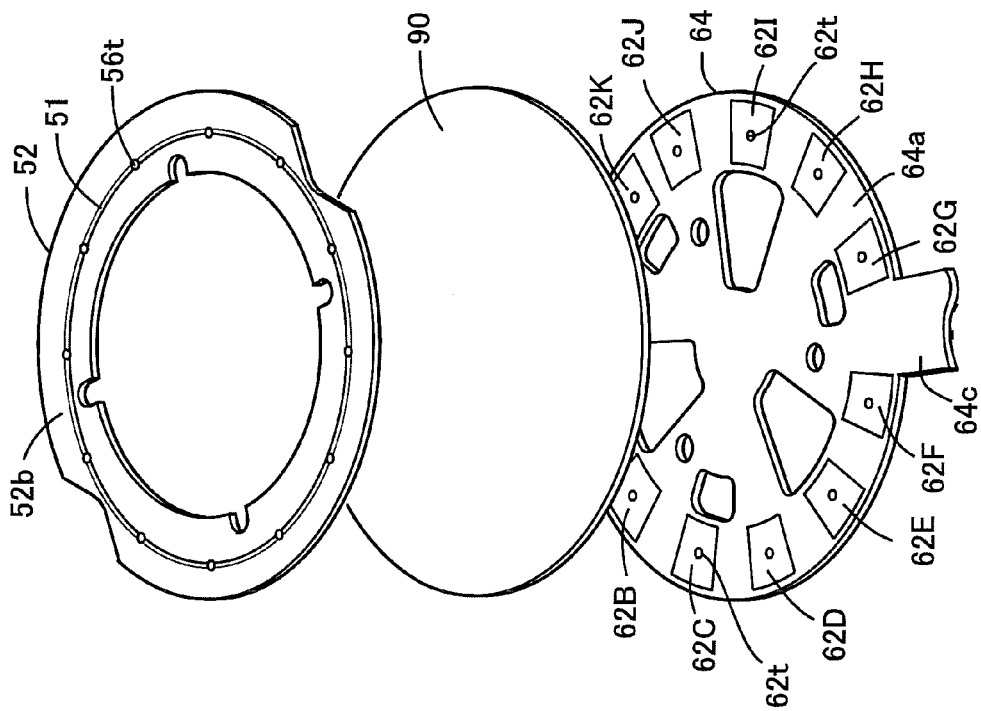
FIG. 19B is its perspective view taken from below.

In Second Embodiment, as shown in FIGS. 19A and 19B, a spacer 90 is interposed between the equally-spaced electrode holding plate 52 and the phase electrode holding plate 64 in the FIG. 4 configuration. FIGS. 19A and 19B are perspective views looking the equally-spaced electrode holding plate 52, the spacer 90 and the phase electrode holding plate 64 from diagonally above and from diagonally below, respectively.

Even if the value of d in Eq. (2) is set small to provide increased capacitance, it is necessary to avoid short-circuiting between the equally-spaced electrode 56 and the phase electrode 62. Further, an increase in distance d causes a decrease in capacitance, leading to decreased accuracy of measurement. Since capacitance also varies with the distance d, it is desirable to keep the distance d constant. With the provision of the circular spacer (an insulating sheet) 90 between the equally-spaced electrode 56 and the phase electrode 62, the distance d could be held constant even under shocks applied from the outside. From the viewpoint of durability, it is also possible to increase the thickness of the spacer, or use two spacers. Further, the presence of air between the electrodes and the spacer could cause the dielectric constant to drop locally, making it impossible to carry out accurate measurement of capacitance; to avoid this, the spacer may be coated over the entire area of its surface with grease or the like.

Further, instead of using the spacer 90, the surface of one or both of the electrode holding plates 56 and 64 may also be coated from above the electrodes with grease or the like, or lubricant resin to prevent direct contact between the equally-spaced electrodes 56 and the phase electrodes 62, thereby providing for enhanced durability.

Further, the spacer 90 may also be fixed, as by bonding, on the phase electrode holding plate 64 or on the equally-spaced electrode holding plate 52. In the case of the FIG. 18 modification, spacers 90 are interposed between the first equally-spaced electrode holding plate 52A and the a-phase electrode holding plate 64A and between the second equally-spaced electrode holding plate 52B and the b-phase electrode holding plate 64B, respectively.

The spacer (insulating sheet) may be made from such a material as coverlay, resist and flexible substrate.

Third Embodiment

Figure 20A:
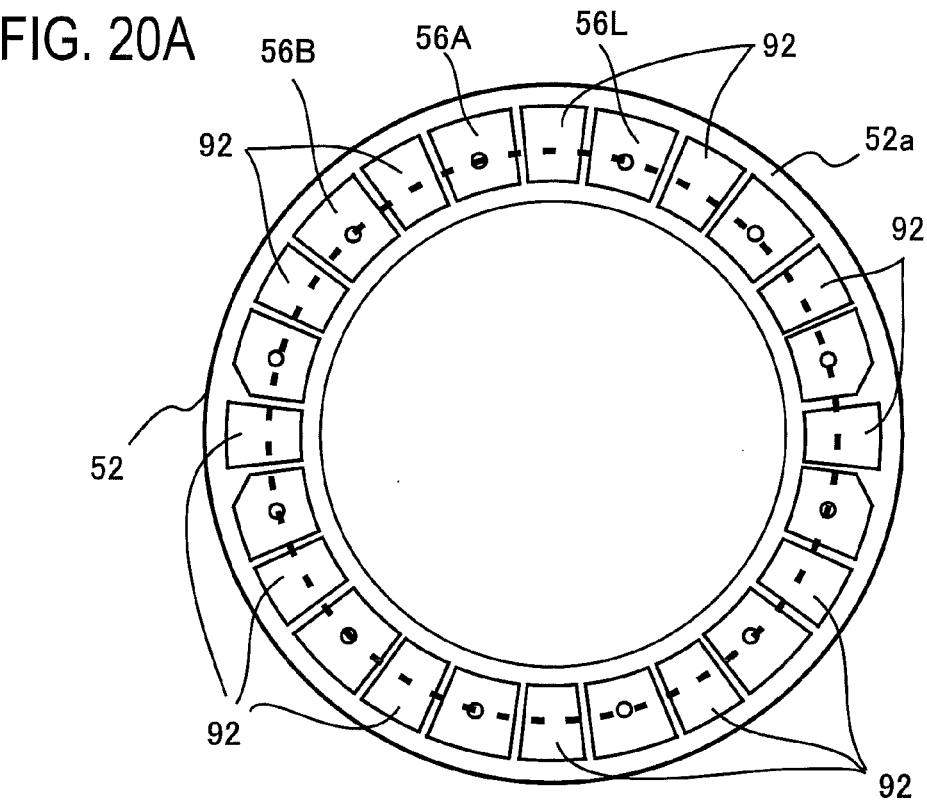
FIG. 20A is a diagram showing an equally-spaced electrode holding surface 52a with insulator segments 92 each disposed between adjacent equally-spaced electrodes.
Figure 20B:
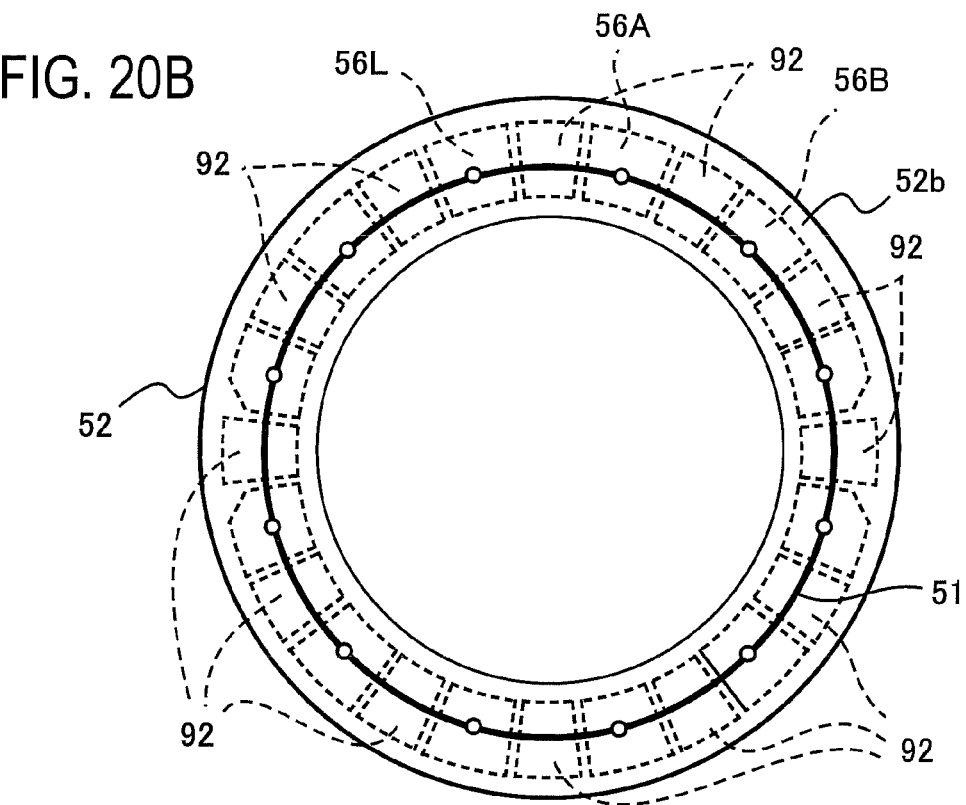
FIG. 20B is a diagram showing the underside of the equally-spaced holding plate.

In Third Embodiment, insulator segments 92 are each disposed between adjacent equally-spaced electrodes 56 on the equally-spaced electrode holding plate 52 of the rotary input device in First Embodiment, and dummy electrodes are each disposed between adjacent phase electrodes 62 on the phase electrode holding plate 64. FIGS. 20A and 20B are plan views showing front and back sides of the equally-spaced electrode holding plate 52 with the insulator segments 92. According to this embodiment, surface irregularities between electrode areas and non-electrode areas in the direction of arrangement of the equally-spaced electrodes 56 can be decreased. The insulator segments 92 may be formed of resist, for instance.

Figure 21:
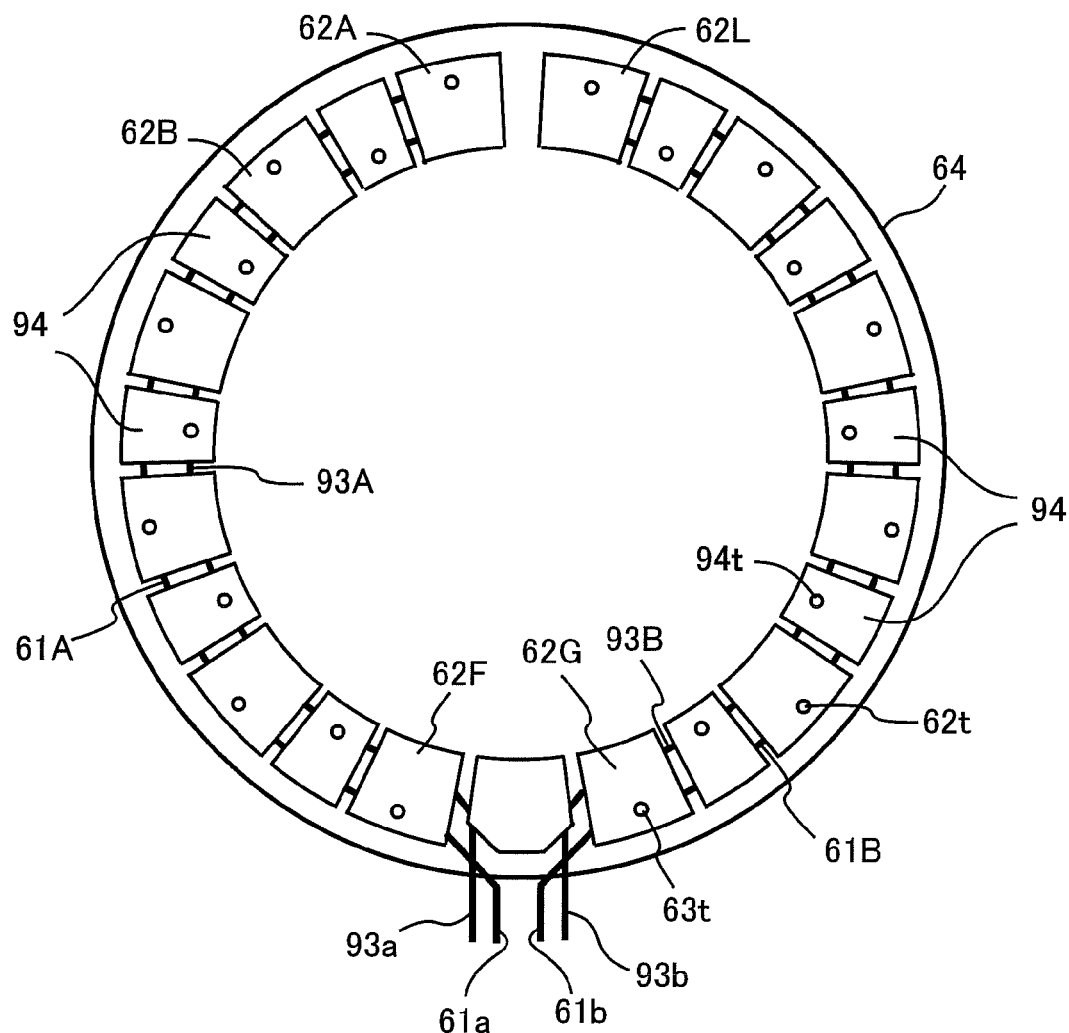
FIG. 21 is a diagram showing the arrangement of the phase electrodes with dummy electrodes 94 each disposed between adjacent ones of them.

FIG. 21 is a plan view illustrating an example in which dummy electrodes 94 are each disposed between adjacent phase electrodes 62 in the direction of arrangement of the phase electrodes on the phase electrode holding plate 64. The dummy electrodes 94 are also each electrically connected to adjacent dummy electrodes by connection lines 93A and 93B on the back side via through holes 94t. The dummy electrodes 94 are formed, for example, by copper foil patterns. The dummy electrodes 94 are connected to the ground (GND) potential via the connection lines 93A, 93B and lead wires 93a, 93b. With the provision of the dummy electrodes 94, it is possible to decrease irregularities in the both sides of the phase electrode holding plate 64 and enhance the capacitance detection sensitivity.

Fourth Embodiment

Figure 22B:
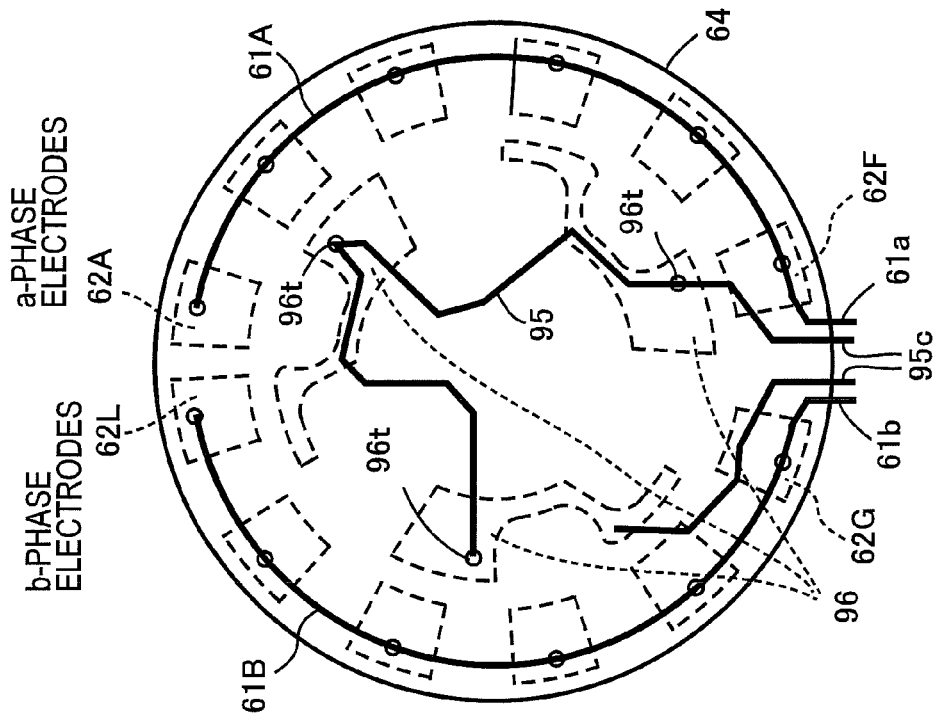
FIG. 22B is a diagram showing the back side of the holding plate.
Figure 22A:
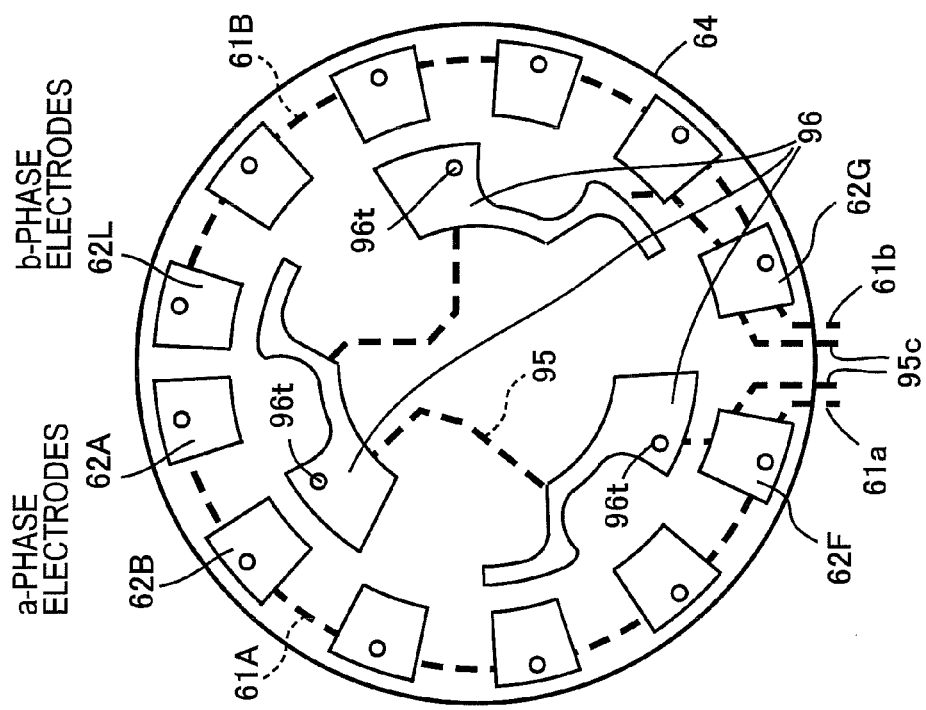
FIG. 22A is a diagram showing the top surface of the phase electrode holding plate 64 with reference electrodes 96 mounted thereon.

In Fourth Embodiment, reference electrodes 96 are disposed on the phase electrode holding plate 64 in the rotary input device of First Embodiment. FIGS. 22A and 22B are plan views of front and back sides of the phase electrode holding plate 64 with the reference electrodes 96 mounted thereon. In the example of FIGS. 22A, 22B, on the front side of the phase electrode holding plate 64 where the phase electrodes 62A to 62L are arranged, three reference electrodes 96 are mounted and are electrically interconnected by connection lines 95 on the back side via through holes 96t. The connection lines 95 are connected via lead wires 95c to the capacitance measuring part 82, enabling the capacitance measuring part 82 to measure stray capacitances of the reference electrodes 96 as well. The reference electrodes 96 are disposed, for example, inside the circular arrangement of the phase electrodes 62 as shown in FIGS. 22A, 22B. The total area of the reference electrodes 96 is selected to be equal to the total area of the a-phase electrodes (consequently, the total area of the b-phase electrodes).

The capacitance to be measured includes also the stray capacitance between the phase electrodes and the ambient object, for example, a user's hand. This stray capacitance varies in dependence on the distance and dielectric constant between the phase electrodes and the surrounding object. The dielectric constant itself also changes with an external temperature change. The factors of such changes affecting the capacitance to be measured will be generically called an environmental change. With the environmental change, the measured value of the a-phase capacitance $C_a$ and the measured value of the b-phase capacitance $C_b$ will change. The purpose of the reference electrodes 96 is to correct the capacitance change resulting from the environmental change. By using the reference electrodes 96 to detect the capacitance changes due to the environmental change and correcting the a-phase capacitance $C_a$ and the b-phase capacitance $C_b$ accordingly, the capacitance measuring part 82 could measure accurate values of the a-phase capacitance $C_a$ and the b-phase capacitance $C_b$. The principles of this correction will be described below.

Figure 23A:
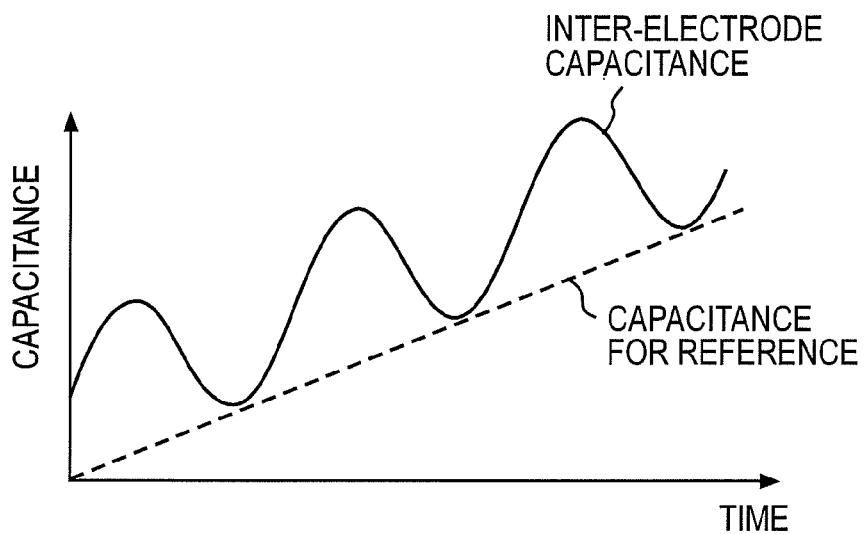
Figure 23B:
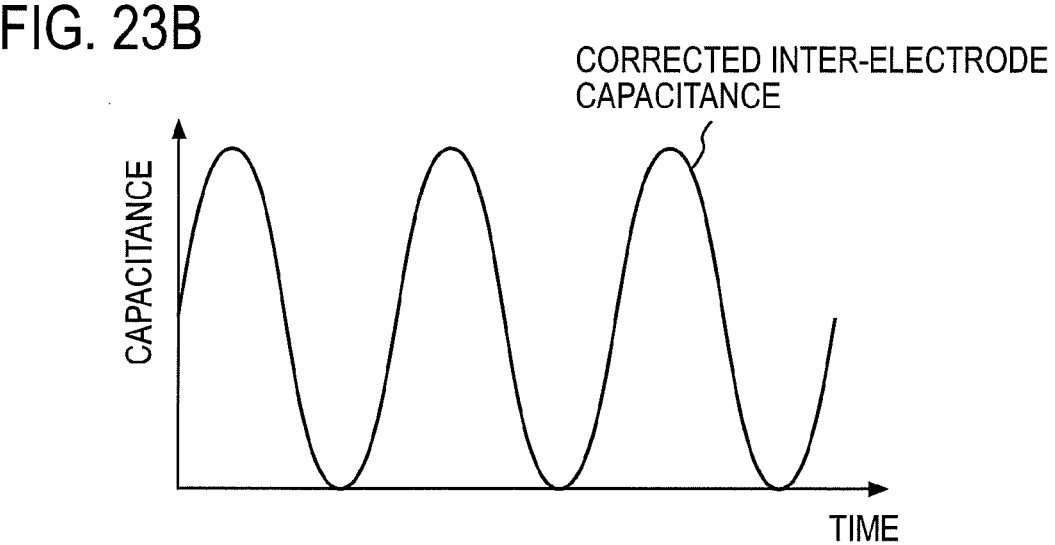
FIG. 23B is a graph showing changes of a corrected inter-electrode capacitance.

FIG. 23A is a graph showing the capacitance ($C_a$ or $C_b$, hereinafter referred to as an inter-electrode capacitance) between the phase electrodes and the equally-spaced electrode by the solid line, and the stray capacitance generated in the reference electrode 96 (which capacitance will hereinafter be referred to as a reference capacitance) by the broken line. The ordinate represents capacitance value, and the abscissa represents time. FIG. 23B is a graph showing the value obtained by subtracting the reference capacitance from the inter-electrode capacitance.

By selecting the total area of the a-phase electrodes 62A to 62F, the total area of the b-phase electrodes 62G to 62L and the total area of the reference electrodes 96 to be equal to one another, it is considered that the influence of ambient environments on these electrodes would be substantially equal. Therefore, by subtracting the reference capacitance from the inter-electrode capacitance, it is possible to obtain an inter-electrode capacitance free from the influence of ambient environmental changes. This correcting function can be implemented either by software in the capacitance measuring part 82, or by an electronic circuit.

First Modification

Figure 24:
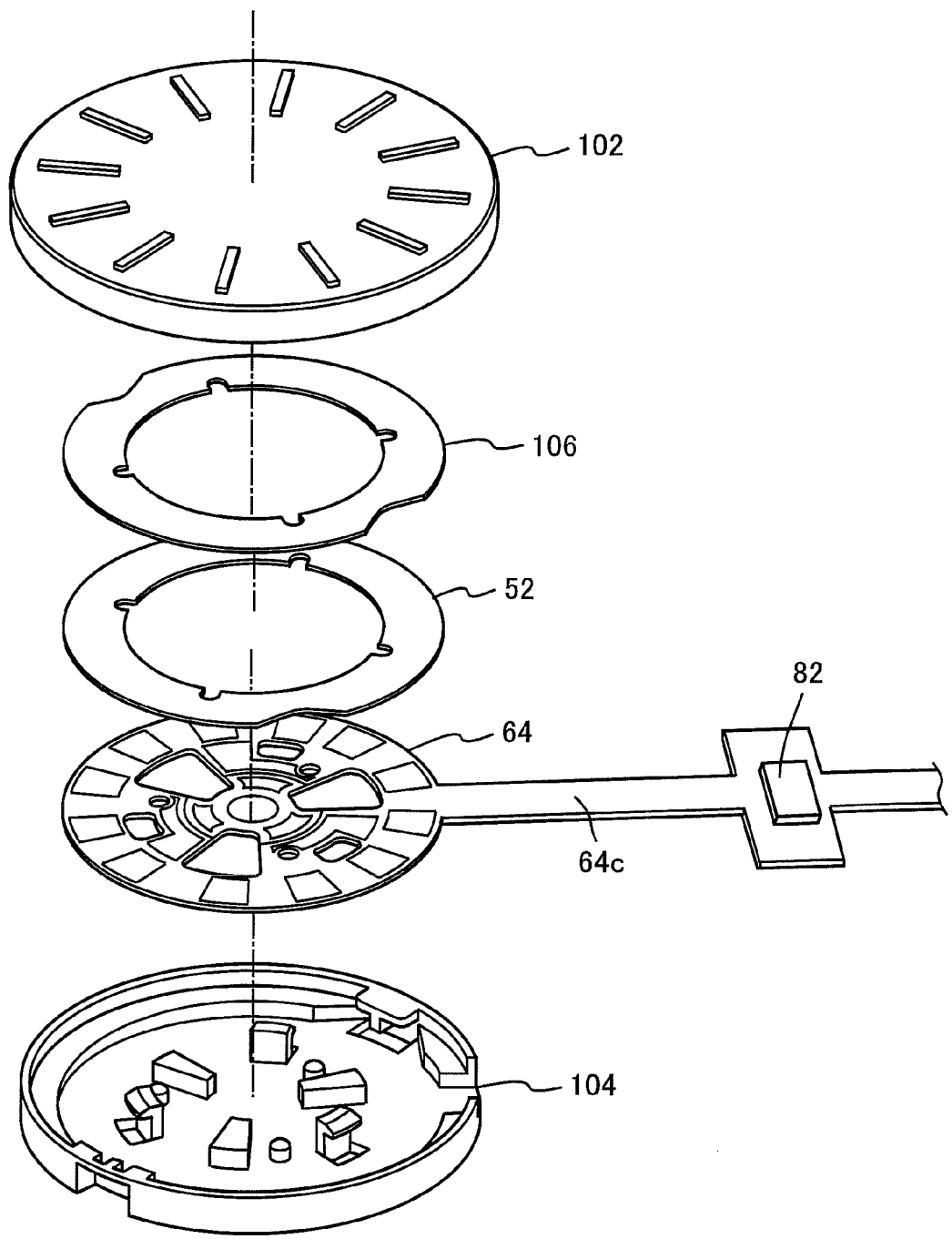
FIG. 24 is an exploded perspective view of the rotary input device provided with a cushion member 106.

FIG. 24 illustrates a modification of the embodiment described previously in respect of FIGS. 2 and 3. As described with reference to FIG. 19, in the case where the spacer 90 is held between the equally-spaced electrode holding plate 52 and the phase electrode holding plate 64, or in the case where one or both of the opposing surfaces of the equally-spaced electrode holding plate 52 and the phase electrode holding plate 64 is given an insulating coating, the equally-spaced electrode holding plate 52 and the phase electrode holding plate 64 can be disposed in abutment with each other. In such an instance, the equally-spaced electrode holding plate 52 and the phase electrode holding plate 64 slide relative to each other through the spacer or coating, by turning of the rotary member 102.

In the case of such a configuration, when an abnormal external force or shock is applied to the rotary member 102, it is likely that the spacer or coating is damaged, giving rise to changes in the detected capacitance during measurement of rotation angle, or that the spacer or coating is broken, causing shortings between the equally-spaced electrode and the phase electrode. To absorb such excessive external force or shock being applied, according to this modification, a cushion sheet 106 held between the rotary member 102 and the equally-spaced electrode holding plate 52 is attached to the inside of the rotary member 102. The cushion sheet 106 absorbs external shocks, hence making it possible to prevent damage to the spacer or coating. Further, since changes in the pressure of contact between the equally-spaced electrode holding plate 52 and the phase electrode holding plate 64 can be reduced, capacitance changes by changes of external force can be decreased.

Second Modification

Figure 25:
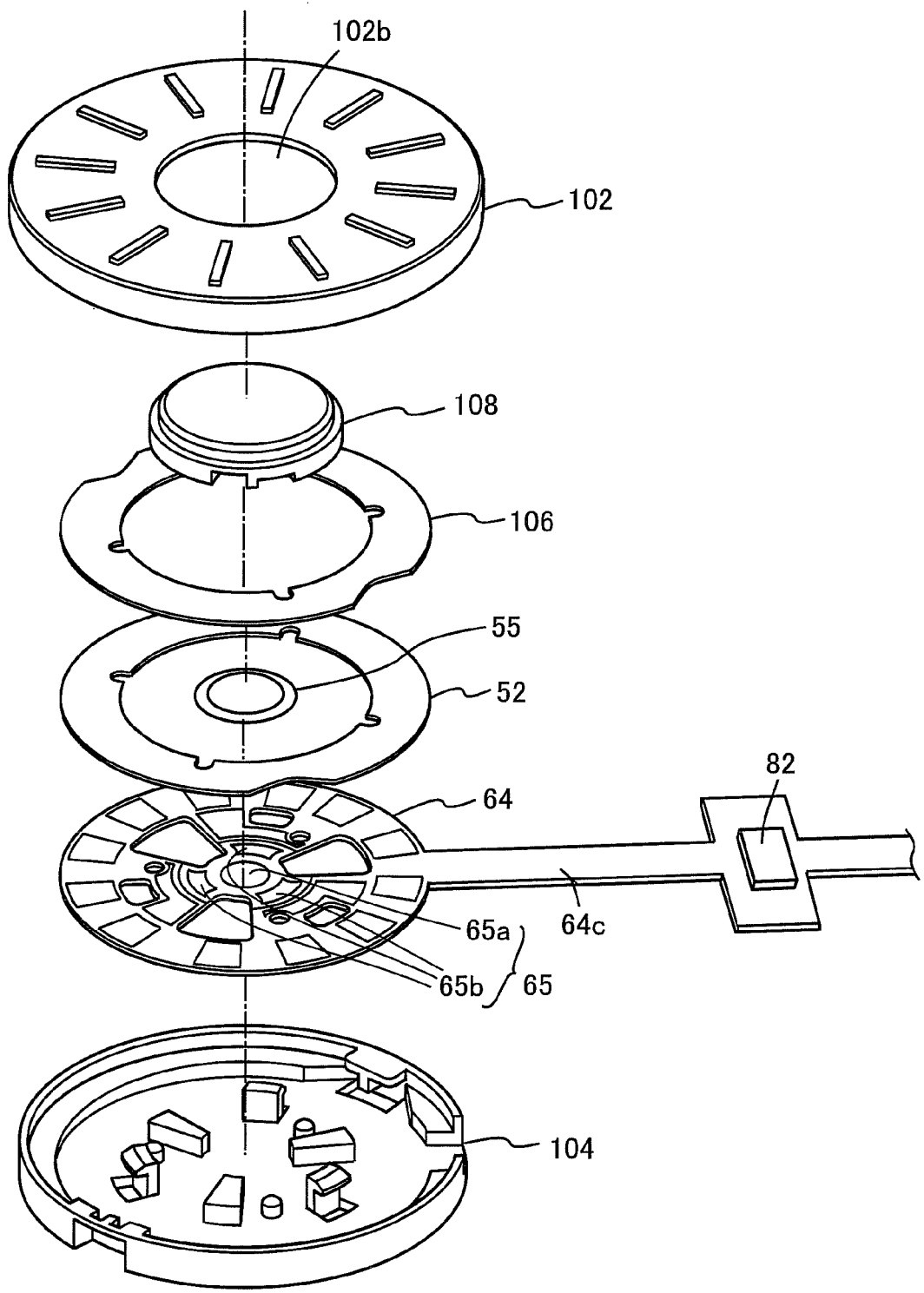
FIG. 25 is an exploded perspective view of the rotary input device provided with a pushbutton member 108.

FIG. 25 is an exploded perspective view of the rotary input device provided with a thin, cylindrical pushbutton member 108. Letting the rotation direction of the rotary member 102 be represented by a z-direction, the provision of the pushbutton member 108 permits detection of an operation in the z-direction as well as the turning operation. As a result, the present invention can be carried out in wider fields. A description will be given of its concrete construction. The rotary member 102 has a centrally-disposed through hole 102b. The pushbutton member 108 is received in the through hole 102b. In the center of the phase electrode holding plate 64 is mounted a convex disc-shaped movable contact 55 made of resilient thin sheet metal. On the phase electrode holding plate 64 there is formed a fixed contact 65 in the region opposite the movable contact 55.

Figure 26B:
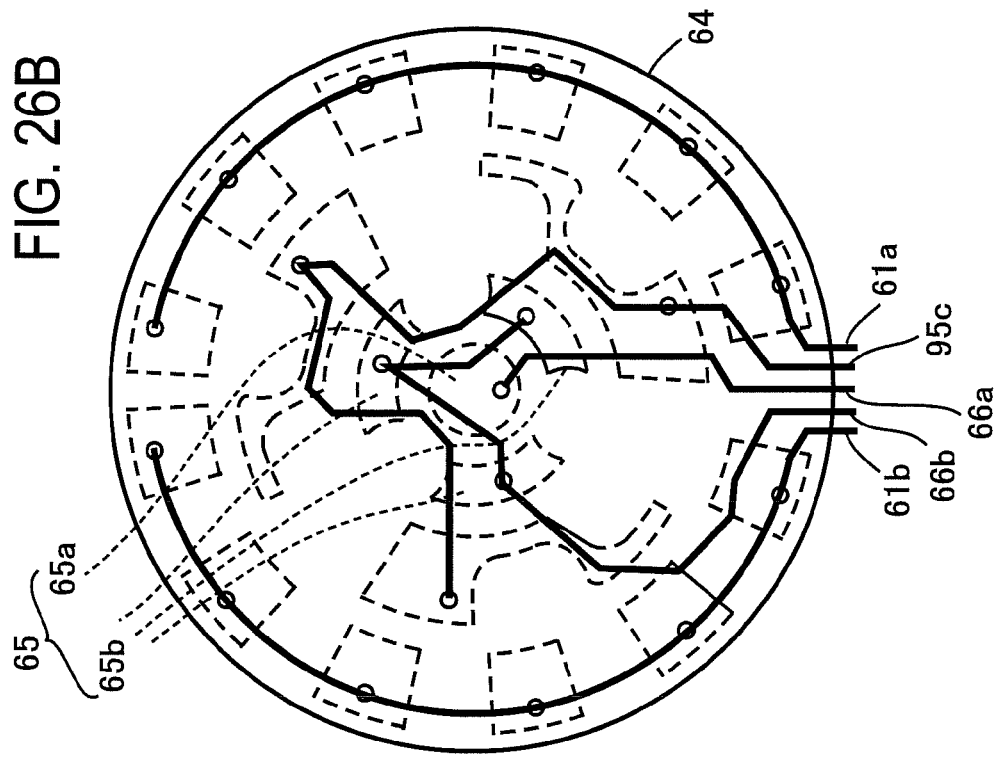
FIG. 26B is a diagram showing its back side.
Figure 26A:
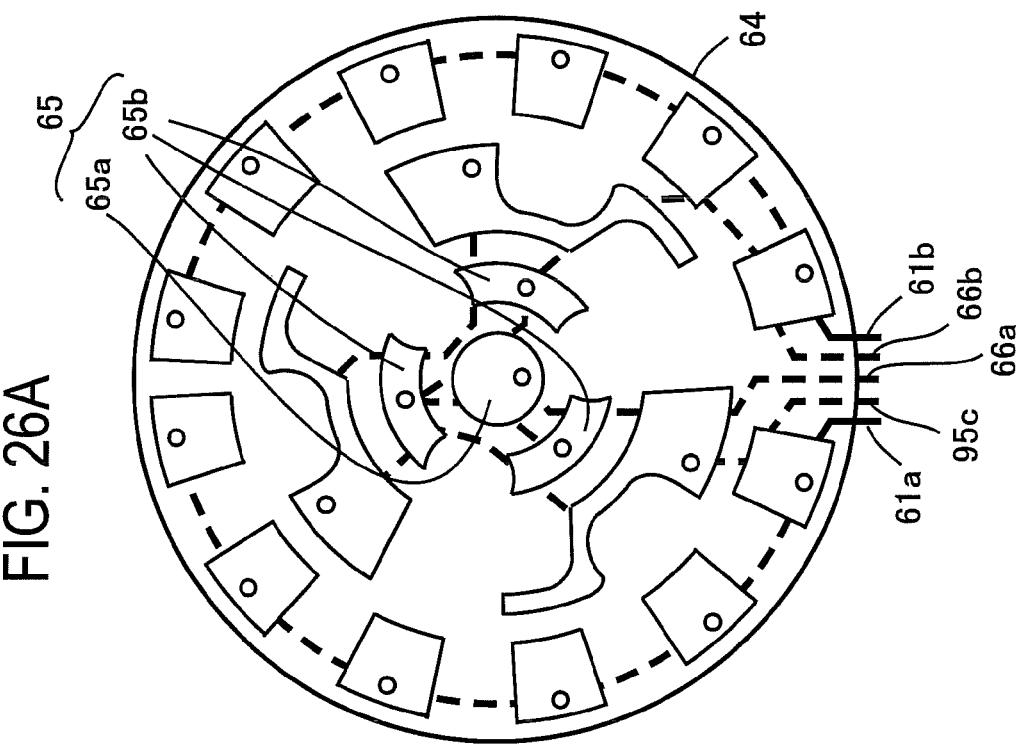
FIG. 26A is a diagram showing the front side of the phase electrode holding plate provided with a fixed contact 65 for the pushbutton use.

FIGS. 26A and 26B are plan views of the front and back sides of the phase electrode holding plate 64 provided with the fixed contact 65. The fixed contact 65 is composed of a central first contact 65a and three second contact 65b arranged circumferentially about it. The movable contact 55 is disposed with its marginal portion resting on these three second contacts 65b. Accordingly, the first contact 65a is located further inside the marginal portion of the movable contact 55, and the first contact 65a and the movable contact 55 are normally out of contact with each other. The three second contacts in touch with the movable contact 55 are interconnected by a connection line 66b, which extends across the lead-out portion 64c of the phase electrode holding plate 64 for external connection, together with a connection line 66a connected to the first contact 65a. On the pushbutton member 108 being pressed down, the movable contact 55 is resiliently bowed inward at the center to establish short-circuits between the first contact 65a and the second contacts 65b, thereby providing an electrical connection between the connection lines 66a and 66b. Accordingly, the depression of the pushbutton member 108 can be detected by detecting the ON/OFF operation of the contacts.

Third Modification

Figure 27:
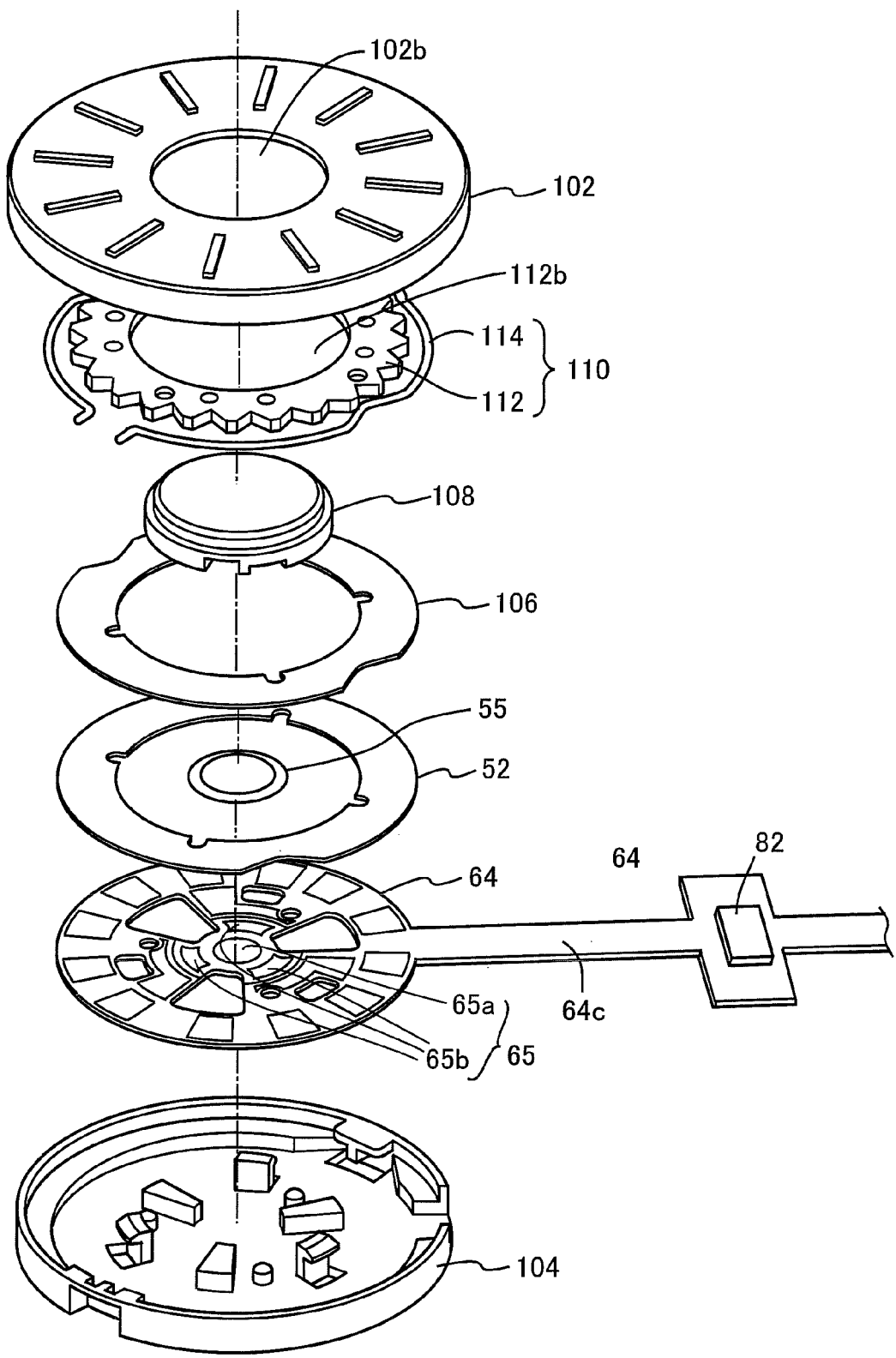
FIG. 27 is an exploded perspective view of the rotary input device provided with a tactile feel feedback part 110.
Figure 28A:
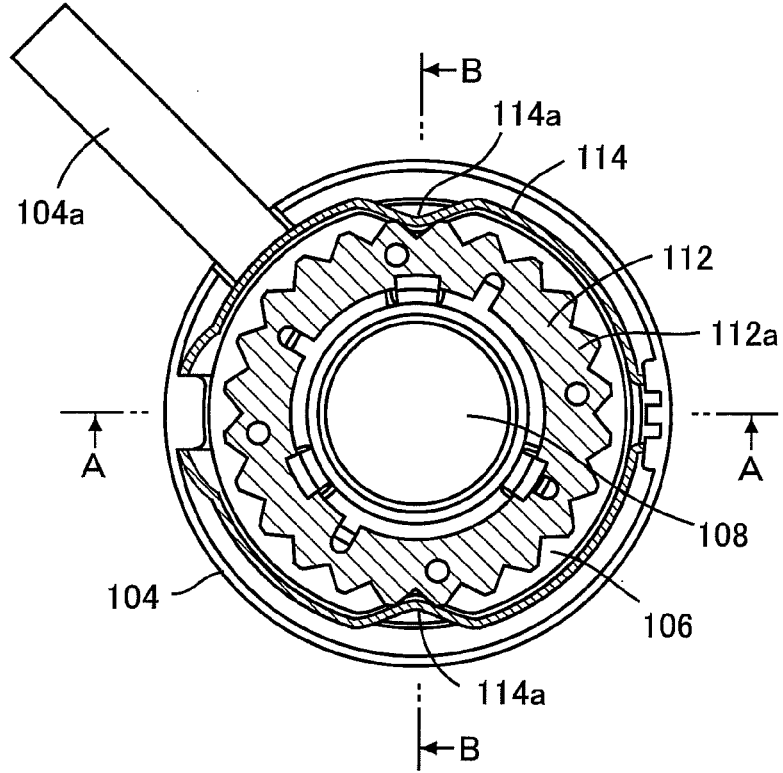
FIG. 28A is a plan view of the rotary input device, with the rotary member 102 taken away.
Figure 28B:
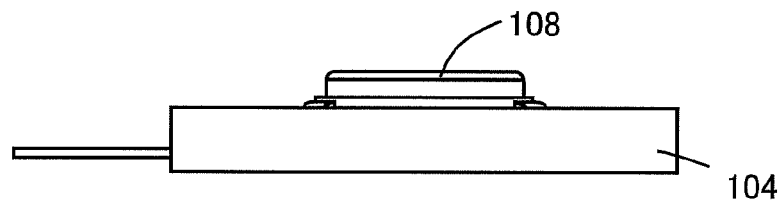
FIG. 28B is its side view.
Figure 29A:
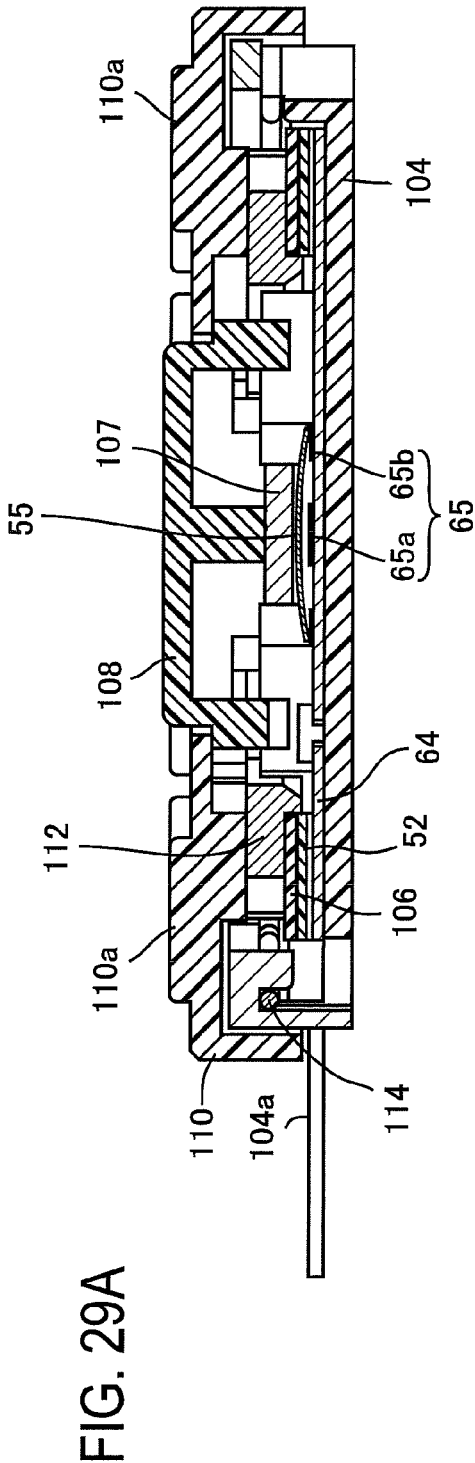
FIG. 29A is a sectional view of the rotary input device, taken along the line A-A in FIG. 28A.
Figure 29B:
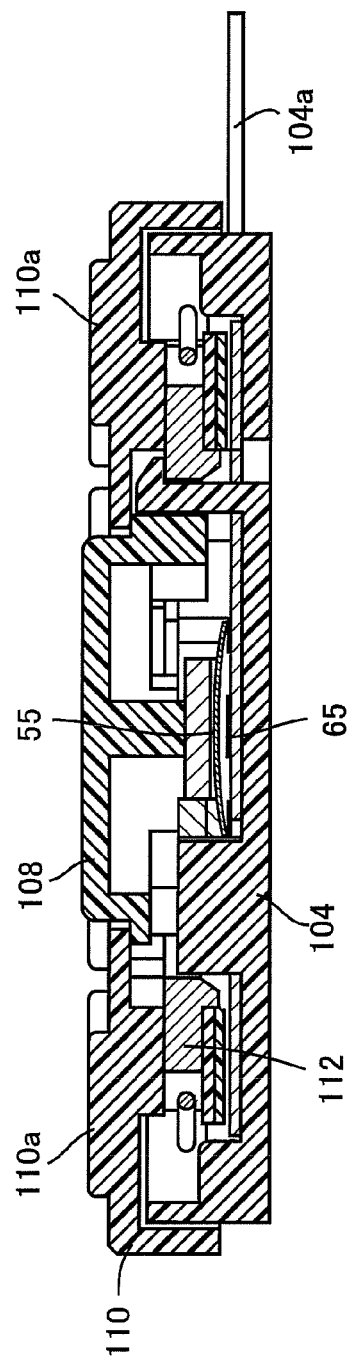
FIG. 29B is a sectional view taken along the line B-B.

FIG. 27 is an exploded perspective view of a rotary input device provided with a tactile feel generating part 110 in the FIG. 25 configuration, and FIGS. 28A and 28B are plan and side views of the rotary input device 50, with the rotary member 102 taken away. Shown in FIG. 29A is a sectional view including the rotary member 102, taken along the line A-A, and shown in FIG. 29B is a sectional view taken along the line B-B. With the tactile feel generating part 110, it is possible to provide tactile response to turning of the rotary member 102 by the user. The tactile feel generating part 110 shown in FIGS. 27 to 29 is comprised of a rotor 112 and a wire spring 114. The rotor 112 is ring-shaped and has a plurality of triangular rotor teeth 112a formed along its periphery. The rotor 112 is fixedly mounted on the back of the rotary member 102, and on the underside of the rotor 112 there are mounted the cushion sheet 106 and the equally-spaced electrode holding plate 52 in this order.

The wire spring 114 is elastically pressed against and fixed to the inner wall surface of the casing 104. The wire spring 114 has at least one bend 114a protruding toward the center of the ring in such a manner as to mesh with the rotor teeth 112a. Accordingly, whenever the bend 114a of the wire spring 114 passes through the peaks and valleys of the rotor teeth 112a during turning of the rotary member 102 with a finger, the strength of the drag against the rotary motion changes, enabling the user to feel the change from the rotary member. In the example of FIG. 28A the wire spring has two diametrically opposite bends 114a. The tactile feel generating part 110 is formed by combining the rotor 112 and the wire spring 114 so that the rotor teeth 112a and the two bends 114a mesh with each other. The example in FIGS. 29A, 29B shows the case of addition of a push-button cushion 107 in order to lighten the load by the press-down motion of the pushbutton member 108.

The rotary input device of the present invention is intended for use in a capacitance type rotary switch which is particularly suitable as an input device built in portable equipment such as a portable telephone, a digital camera, PC, PDA, and so forth; since no connection lines are led out from the equally-spaced electrodes mounted on the rotary member, a long-life and miniature rotary input device can be realized. Moreover, the use of the reference electrodes enables correction of capacitance changes caused by ambient environmental changes, ensuring accurate angle measurements.

What is claimed is:

1. A rotary input device comprises:
a casing;
a disc-shaped rotary member rotatably supported to said casing;
an equally-spaced electrode holding plate having N first equally-spaced electrodes spaced equidistantly along a first circle and N second equally-spaced electrodes spaced equidistantly along a second circle parallel to said first circle, said equally-spaced electrode holding plate being attached to said rotary member, said N being an integer equal to or greater than 1, and said first and second equally-spaced electrodes being electrically interconnected; and
a phase electrode holding plate having α a-phase electrodes disposed along a third circle opposite said first circle in parallel relation thereto and electrically interconnected, β b-phase disposed along a fourth circle opposite said second circle in parallel relation thereto and electrically interconnected, and first and second lead wires electrically connected to said a-phase electrodes and said b-phase electrodes, respectively, said phase electrode holding plate being fixed to said casing, said a being an integer equal to or greater than 1 and said β being an integer equal to or greater than 1;
wherein said equally-spaced electrode holding plate and said phase electrode holding plate are disposed so that the centers of said first through fourth circles all lie on the line of the center of rotation of said rotary member and that said line of the center of rotation crosses at right angles all planes defined by said first through fourth circles, respectively;
wherein when said α is equal to or greater than 2, two arbitrary ones of said a-phase electrodes lie on the circumference of said second circle at positions displaced an angle of an integral multiple of $2\pi/N$ apart;
wherein when said β is equal to or greater than 2, two arbitrary ones of said b-phase electrodes lie on the circumference of said second circle at positions displaced an angle of an integral multiple of $27/N$ apart; and
wherein said a-phase electrodes and said b-phase electrodes are arranged with respect to the arrangement of said equally-spaced electrodes so that the angle from the rotational angular position of said equally-spaced electrode holding plate where said first equally-spaced electrodes and said a-phase electrodes overlap most with each other to the rotational angular position of said equally-spaced electrode holding plate where said second equally-spaced electrodes and said b-phase electrodes overlap most with each other may be an angle that is displaced from an integral multiple of $\pi/N$ by a predetermined angle ω which is greater than 0 but smaller than $\pi/N$.

2. A rotary input device comprises:
a casing;
a disc-shaped rotary member rotatably supported to said casing;
an equally-spaced electrode holding plate having N equally-spaced electrodes spaced equidistantly along a first circle, said equally-spaced electrode holding plate being attached to said rotary member, said N being an integer equal to or greater than 1 and said equally-spaced electrodes being electrically interconnected; and
a phase electrode holding plate having α a-phase electrodes disposed along a second circle opposite said first circle in parallel relation thereto and electrically interconnected, β b-phase electrodes disposed along a third circle opposite said first circle in parallel relation thereto and electrically interconnected, and first and second lead wires electrically connected to said a-phase electrodes and said b-phase electrodes, respectively, said phase electrode holding plate being fixed to said casing, said a being an integer equal to or greater than 1 and said β being an integer equal to or greater than 1;
wherein said equally-spaced electrode holding plate and said phase electrode holding plate are disposed so that the centers of said first through third circles all lie on the line of the center of rotation of said rotary member and that said line of the center of rotation crosses at right angles all planes defined by said first through third circles, respectively;
wherein when said α is equal to or greater than 2, two arbitrary ones of said a-phase electrodes lie on the circumference of said second circle at positions displaced an angle of an integral multiple of $2\pi/N$ apart;
wherein when said β is equal to or greater than 2, two arbitrary ones of said b-phase electrodes lie on the circumference of said second circle at positions displaced an angle of an integral multiple of $2\pi/N$ apart; and
wherein said a-phase electrodes and said b-phase electrodes are arranged with respect to the arrangement of said equally-spaced electrodes so that the angle from the rotational angular position of said equally-spaced electrode holding plate where said equally-spaced electrodes and said a-phase electrodes overlap most with each other to the rotational angular position of said equally-spaced electrode holding plate where said equally-spaced electrodes and said b-phase electrodes overlap most with each other may be an angle that is displaced from an integral multiple of $\pi/N$ by a predetermined angle ω which is greater than 0 but smaller than $\pi/N$.

3. A rotary input device comprises:
a casing;
a disc-shaped rotary member rotatably supported to said casing;
an equally-spaced electrode holding plate having N equally-spaced electrodes spaced equidistantly along a first circle, said equally-spaced electrode holding plate being attached to said rotary member, said N being an integer equal to or greater than 1 and said equally-spaced electrodes being electrically interconnected; and
a phase electrode holding plate having α a-phase electrodes disposed along a second circle opposite said first circle in parallel relation thereto and electrically interconnected, β b-phase electrodes disposed along said second circle and electrically interconnected and first and second lead wires electrically connected to said a-phase electrodes and said b-phase electrodes, respectively, said phase electrode holding plate being fixed to said casing, said a being an integer equal to or greater than 1 and said P being an integer equal to or greater than 1;
wherein said equally-spaced electrode holding plate and said phase electrode holding plate are disposed so that the centers of said first and second circles lie on the line of the center of rotation of said rotary member and that said line of the center of rotation crosses at right angles planes defined by said first and third circles, respectively;

wherein when said $\alpha$ is equal to or greater than 2, two arbitrary ones of said a-phase electrodes lie on the circumference of said second circle at positions displaced an angle of an integral multiple of $2\%/N$ apart;

wherein when said $\beta$ is equal to or greater than 2, two arbitrary ones of said b-phase electrodes lie on the circumference of said second circle at positions displaced an angle of an integral multiple of $2\pi/N$ apart; and wherein said a-phase electrodes and said b-phase electrodes are arranged with respect to the arrangement of said equally-spaced electrodes so that the angle from the rotational angular position of said equally-spaced electrode holding plate where said equally-spaced electrodes and said a-phase electrodes overlap most with each other to the rotational angular position of said equally-spaced electrode holding plate where said equally-spaced electrodes and said b-phase electrodes overlap most with each other may be an angle that is displaced apart from an integral multiple of $\pi/N$ by a predetermined angle $\omega$ which is greater than 0 but smaller than $\pi/N$.

4. The rotary input device of any one of claims 1, 2 and 3, wherein said N is an even number and $\alpha=\beta=N/2$.

5. The rotary input device of any one of claims 1, 2 and 3, wherein a spacer is interposed between said equally-spaced electrode holding plate and said phase electrode holding plate.

6. The rotary input device of any one of claims 1, 2 and 3, wherein an insulating sheet is attached to at least one of the surface of said equally-spaced electrode holding plate having arranged thereon said equally-spaced electrodes and the surface of said phase electrode holding plate having arranged thereon said a-phase electrodes and said b-phase electrodes.

7. The rotary input device of any one of claims 1, 2 and 3, wherein said equally-spaced electrode holding plate has insulator segments each disposed between adjacent ones of said equally-spaced electrodes.

8. The rotary input device of any one of claims 1, 2 and 3, wherein said phase electrode holding plate has electrically interconnected first dummy electrodes each disposed between adjacent ones of said a-phase electrodes, and electrically interconnected second dummy electrodes each disposed between adjacent ones of said b-phase electrodes.

9. The rotary input device of any one of claims 1, 2 and 3, wherein said phase electrode holding plate has reference electrodes for correcting capacitance changes by ambient environments.

10. The rotary input device of any one of claims 1, 2 and 3, wherein a cushion member is interposed between said rotary member and said equally-spaced electrode holding plate.

11. The rotary input device of any one of claims 1, 2 and 3, further comprising:

a pushbutton member received in a through hole made in said rotary member centrally thereof for depression toward said line of the center of rotation;

a first fixed contact formed on said phase electrode holding plate and disposed at the center thereof about which said a-phase electrode and said b-phase electrodes are arranged;

second fixed contacts disposed between the arrangements of said a-phase electrodes and said b-phase electrodes and said first fixed contact; and a curved, disc-shaped movable contact formed of resilient sheet metal and mounted on said second fixed contacts in a manner to hang over said first fixed contact;

wherein said movable contact is adapted to provide a electrical connection between said first fixed contact and said second fixed contacts.

12. The rotary input device of any one of claims 1, 2 and 3, further comprising a tactile feel generating part including: a rotor fixed to said rotary member and having teeth formed along its periphery; and a ring-shaped wire spring held by said casing and having protrusions for resiliently meshing with said rotor teeth.

13. A revolution sensor comprises:

said rotary input device claimed in any one of claims 1, 2 and 3;

a capacitance measuring part for measuring a-phase capacitances formed by said equally-spaced electrodes and said a-phase electrodes and b-phase capacitances formed by said equally-spaced electrodes and said b-phase electrodes, through said first and second lead wires; and an angle calculating part for calculating at least one of the direction and angle of rotation of said rotary member from the results of measurement of said a-phase capacitances and the results of measurement of said b-phase capacitances.

* * * * *